(12) United States Patent
Song et al.

(10) Patent No.: US 10,742,369 B2
(45) Date of Patent: Aug. 11, 2020

(54) APPARATUS AND METHOD FOR RECEIVING SIGNAL IN WIRELESS COMMUNICATION SYSTEM

(71) Applicant: Samsung Electronics Co., Ltd., Gyeonggi-do (KR)

(72) Inventors: Seong-Jun Song, Gyeonggi-do (KR); Kyung-Hwan Jo, Gyeonggi-do (KR); Eun-Ji Kim, Gyeonggi-do (KR); Jae-Hyun Kwon, Gyeonggi-do (KR); Sungjin Kim, Gyeonggi-do (KR); Donginn Seo, Gyeonggi-do (KR); Dohyeon Lee, Gyeonggi-do (KR); Seung Chul Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 113 days.

(21) Appl. No.: 15/807,240

(22) Filed: Nov. 8, 2017

(65) Prior Publication Data

US 2018/0131478 A1  May 10, 2018

(30) Foreign Application Priority Data

Nov. 8, 2016  (KR) .................. 10-2016-0148113

(51) Int. Cl.
*H04L 5/00* (2006.01)
*H04B 7/08* (2006.01)
(Continued)

(52) U.S. Cl.
CPC ........... *H04L 5/001* (2013.01); *H04B 1/0064* (2013.01); *H04B 7/04* (2013.01); *H04B 7/0848* (2013.01); *H04W 40/02* (2013.01); *H04B 17/13* (2015.01)

(58) Field of Classification Search
CPC ......... H04B 1/0064; H04B 7/04; H04L 5/001; H04W 40/02
See application file for complete search history.

(56) References Cited

U.S. PATENT DOCUMENTS 8,630,319 B2   1/2014  Pazhyannur et al.
2010/0085934 A1  4/2010  Wang et al.
(Continued)

FOREIGN PATENT DOCUMENTS

JP   2006-217399   8/2006

OTHER PUBLICATIONS

European Search Report dated Mar. 12, 2018 issued in counterpart application No. 17200674.4-1220, 7 pages.
(Continued)

*Primary Examiner* — Andrew Lai
*Assistant Examiner* — M Mostazir Rahman
(74) *Attorney, Agent, or Firm* — The Farrell Law Firm, P.C.

(57) ABSTRACT

An electronic device is provided. The electronic device includes a first antenna for a first band and a second band, a second antenna for the second band and a third band and a pre-processing unit configured to generate, based on identifying a frequency band of a first signal received via the first antenna and a frequency band of a second signal received via the second antenna are the second band, a pre-processed signal by combining the first signal and the second signal based on a ratio of a weight factor, and to transmit the pre-processed signal to a first radio frequency (RF) receiver.

19 Claims, 11 Drawing Sheets

(51) Int. Cl.
H04B 1/00 (2006.01)
H04B 7/04 (2017.01)
H04W 40/02 (2009.01)
H04B 17/13 (2015.01)

(56) References Cited

U.S. PATENT DOCUMENTS

| | | |
|---|---|---|
| 2010/0120386 A1 | 5/2010 | Konstantinos et al. |
| 2013/0005277 A1* | 1/2013 | Klomsdorf ........... H01Q 1/2266 455/77 |
| 2013/0028341 A1 | 1/2013 | Ayach et al. |
| 2013/0178179 A1 | 7/2013 | Han et al. |
| 2014/0170999 A1 | 6/2014 | Amin |
| 2014/0179240 A1 | 6/2014 | Reinhardt et al. |
| 2014/0227982 A1* | 8/2014 | Granger-Jones ..... H04B 7/0404 455/77 |
| 2014/0233628 A1 | 8/2014 | Shen et al. |

OTHER PUBLICATIONS

International Search Report dated Mar. 14, 2018 issued in counterpart application No. PCT/KR2017/012571, 10 pages.
European Search Report dated Jun. 25, 2018 issued in counterpart application No. 17200674.4-1220, 11 pages.

* cited by examiner

APPARATUS AND METHOD FOR RECEIVING SIGNAL IN WIRELESS COMMUNICATION SYSTEM

PRIORITY

The present application claims priority under 35 U.S.C. § 119(a) to Korean Patent Application Serial No. 10-2016-0148113, which was filed in the Korean Intellectual Property Office on Nov. 8, 2016, the entire disclosure of which is incorporated herein by reference.

BACKGROUND

1. Field of the Disclosure

The present disclosure relates, generally, to a wireless communication system, and more particularly, to an apparatus and a method for receiving a signal transmitted using a carrier aggregation (CA) scheme in the wireless communication system.

2. Description of the Related Art

When a plurality of antennas are used to receive signals of a long term evolution (LTE) CA band, the antennas each send received signals to corresponding radio frequency (RF) receivers, which in turn send the received signals to a baseband end, which then combines the received signals. However, combining the signals at the baseband end not only increases current consumed by the receiver, but also requires relatively high complexity in hardware implementation.

SUMMARY

The present disclosure has been made to address at least the disadvantages described above and to provide at least the advantages described below. Accordingly, an aspect of the present disclosure is to provide an apparatus and a method for effectively receiving a signal in a wireless communication system.

An aspect of the present disclosure is to provide an apparatus and a method for effectively receiving a signal transmitted using CA in a wireless communication system.

Another aspect of the present disclosure is to provide an apparatus and a method for reducing implementation cost by combining signals received from antennas at an RF front end in a wireless communication system.

Still another aspect of the present disclosure is to provide an apparatus and a method for reducing the number of RF receivers by combining signals at an RF front end in a wireless communication system.

Yet another aspect of the present disclosure is to provide an apparatus and a method for effectively receiving a signal by configuring a different path per antenna, according to an antenna performance difference in a wireless communication system.

One aspect of the present disclosure, a an electronic device can include a first antenna for a first band and a second band, a second antenna for the second band and a third band and a pre-processing unit configured to generate, based on identifying a frequency band of a first signal received via the first antenna and a frequency band of a second signal received via the second antenna are the second band, a pre-processed signal by combining the first signal and the second signal based on a ratio of a weight factor, and to transmit the pre-processed signal to a first radio frequency (RF) receiver.

According to another aspect of the present disclosure, a method of an electronic device can include generating, by a pre-processing unit, based on identifying a frequency band of a first signal received via a first antenna and a frequency band of a second signal received via a second antenna are the second band, a pre-processed signal by combining the first signal and the second signal based on a ratio of a weight factor, and providing, by the pre-processing unit the pre-processed signal to a first RF receiver. The first antenna can be an antenna for a first band and the second band, and the second antenna can be an antenna for the second band and a third band.

According to still another aspect of the present disclosure, an electronic device can include a first antenna for a first band and a second band, a second antenna for the second band and a third band, and an analog combiner configured, when receiving a first signal of the second band via the first antenna and a second signal of the second band via the second antenna, to generate a third signal for obtaining a diversity gain by combining the first signal and the second signal based on a ratio which is determined by an impedance value of each of impedance components of the analog combiner, and to provide the third signal to a receiver. Information included in the first signal corresponds to information included in the second signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Figure 1:
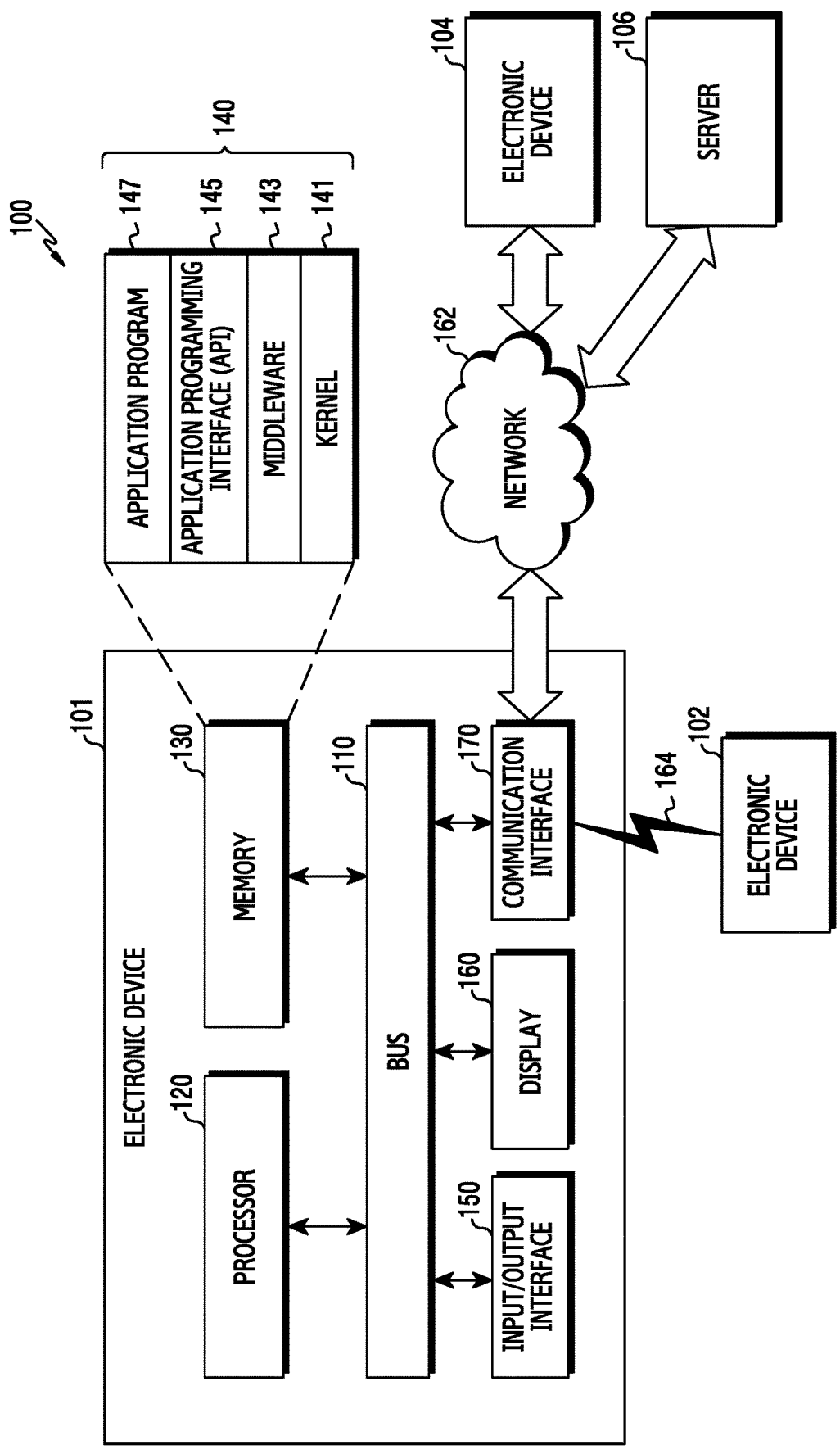
FIG. 1 is a diagram of a network environment including an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even terms defined in this disclosure should not be interpreted as excluding embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an application-specific integrated circuit (ASIC) chip, a field-programmable gate arrays (FPGA), and a programmable-logic device for performing operations which has been known or are to be developed hereinafter.

A non-transitory computer-readable recording media may include a hard disk, a floppy disk, a magnetic media (e.g., a magnetic tape), an optical recording media (e.g., a compact disk-read only memory (CD-ROM) and/or a digital versatile disk (DVD)), a magneto-optical media (e.g., a floptical disk), an internal memory, etc. An instruction may include a code that is made by a compiler or a code that is executable by an interpreter. A module or program module may further include at least one or more of the aforementioned constituent elements, or omit some, or further include another constituent element. Operations carried out by a module, a program module or another constituent element may be executed in a sequential, parallel, repeated or heuristic manner, or at least some operations may be executed in different order or may be omitted, or another operation may be added.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

Referring initially to FIG. 1, an electronic device 101 resides in a network environment 100. The electronic device 101 includes a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a central processing unit (CPU), an application processor (AP), and a communication processor (CP). The processor 120 can perform an operation or data processing with respect to control and/or communication of at least another component of the electronic device 101.

The memory 130 can include a volatile and/or nonvolatile memory. The memory 130 can store commands or data relating to at least another component of the electronic device 101. The memory 130 can store software and/or a program 140. The program 140 can include a kernel 141, middleware 143, an application programming interface (API) 145, and/or an application program (or application) 147. At least part of the kernel 141, the middleware 143, or the API 145 can be referred to as an operating system (OS). The kernel 141 can control or manage system resources (e.g., the bus 110, the processor 120, or the memory 130) used for performing operations or functions implemented by the other programs (e.g., the middleware 143, the API 145, or the application 147). Additionally, the kernel 141 can provide an interface for controlling or managing system resources by accessing an individual component of the electronic device 101 from the middleware 143, the API 145, or the application 147.

The middleware 143 can serve an intermediary role for exchanging data between the API 145 or the application 147 and the kernel 141 through communication. Additionally, the middleware 143 can process one or more job requests received from the application 147, based on their priority. For example, the middleware 143 can assign a priority for using a system resource (e.g., the bus 110, the processor 120, or the memory 130) of the electronic device 101 to at least one of the applications 147, and process the one or more job requests. The API 145, as an interface through which the application 147 controls a function provided from the kernel 141 or the middleware 143, can include at least one interface or function (e.g., an instruction) for file control, window control, image processing, or character control. The input/output interface 150 can deliver commands or data inputted from a user or another external device to other component(s) of the electronic device 101, or output commands or data inputted from the other component(s) of the electronic device 101 to the user or another external device.

The display 160 can include a liquid crystal display (LCD), a light emitting diode (LED) display, an organic light emitting diode (OLED) display, a microelectromechanical systems (MEMS) display, or an electronic paper display. The display 160 can display various contents (e.g., texts, images, videos, icons, and/or symbols) to the user. The display 160 can include a touch screen and receive touch, gesture, proximity, or hovering inputs by using an electronic pen or a user's body part. The communication interface 170 can set a communication between the electronic device 101 and a first external electronic device 102, a second external electronic device 104, or a server 106. For example, the communication interface 170 can communicate with the second external electronic device 104 or the server 106 over a network 162 through wireless communication or wired communication.

The wireless communication, for example, can include cellular communication using at least one of LTE, LTE-advanced (LTE-A), code division multiple access (CDMA), wideband CDMA (WCDMA), universal mobile telecommunications system (UMTS), wireless broadband (WiBro), or global system for mobile communications (GSM). The wireless communication can include at least one of wireless-fidelity (WiFi), bluetooth (BT), BT low energy (BLE), zigbee, near field communication (NFC), magnetic secure transmission, RF, and body area network (BAN). The wireless communication can include GNSS. The GNSS can include global positioning system (GPS), global navigation satellite system (GLONASS), Beidou navigation satellite system, or Galileo (the European global satellite-based navigation system). Hereinafter, the term GPS can be interchangeably used with the term GNSS. The wired communication can include at least one of universal serial bus (USB), high definition multimedia interface (HDMI), recommended standard 232 (RS-232), power line communications, and plain old telephone service (POTS). The network 162 can include a telecommunications network, for example, at least one of computer network (e.g., local area network (LAN) or wide area network (WAN)), Internet, and telephone network.

Each of the first and second external electronic devices 102 and 104 can be of the same as or of a different type from that of the electronic device 101. All or part of operations executed in the electronic device 101 can be executed by the electronic device 102 or 104, or the server 106. To perform a function or service automatically or by request, instead of performing the function or the service by the electronic device 101, the electronic device 101 can request at least part of a function relating thereto from the electronic device 102 or 104, or the server 106. The electronic device 102 or 104, or the server 106 can perform the requested function or an additional function and send its result to the electronic device 101. The electronic device 101 can provide the requested function or service by processing the received result. In doing so cloud computing, distributed computing, or client-server computing techniques can be used.

Figure 2:
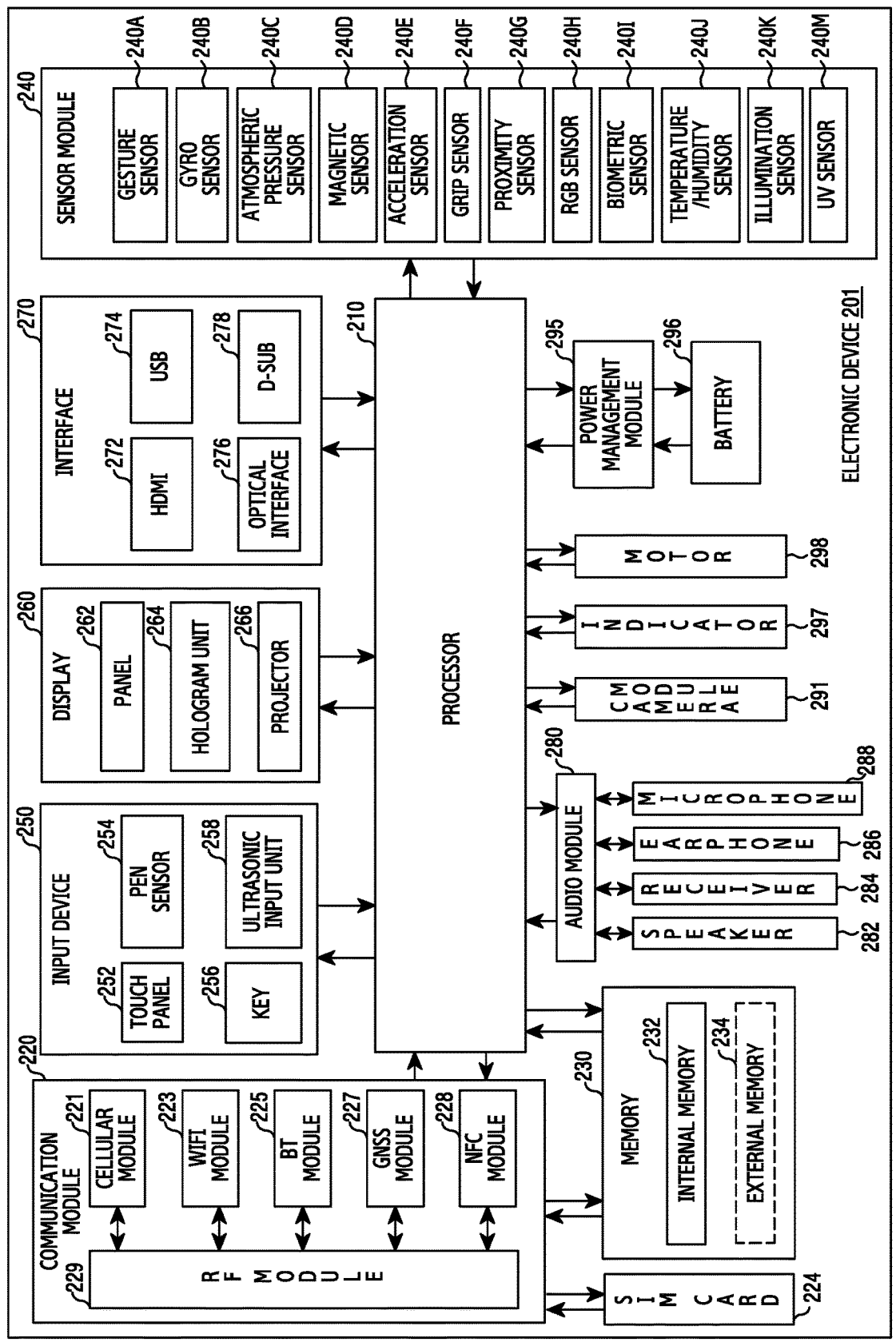
FIG. 2 is a block diagram of an electronic device, according to an embodiment of the present disclosure.

FIG. 2 is a block diagram of an electronic device 201, according to an embodiment of the present disclosure. The electronic device 201 can include all or part of the above-described electronic device 101 of FIG. 1. The electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 can control a plurality of hardware or software components connected to the processor 210, and also can perform various data processing and operations by executing an OS or an application program. The processor 210 can be implemented with a system on chip (SoC). The processor 210 can further include a graphic processing unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration as the communication interface 170 of FIG. 1. The communication module 220 can include the cellular module 221, a WiFi module 223, a BT module 225, a GNSS module 227, an NFC module 228, and an RF module 229. The cellular module 221 can provide voice call, video call, short message service (SMS), or Internet service through a communication network. The cellular module 221 can identify and authenticate the electronic device 201 in a communication network by using the SIM 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one integrated circuit (IC) or an IC package. The RF module 229 can transmit/receive a communication signal (e.g., an RF signal). The RF module 229 can include a transceiver, a power amp module (PAM), a frequency filter, an LNA, or an antenna. At least one of the cellular module 221, the WiFi module 223, the BT module 225, the GNSS module 227, and the NFC module 228 can transmit/receive an RF signal through an additional RF module. The SIM 224 can be a card or an embedded SIM, and also can contain unique identification information (e.g., an integrated circuit card identifier (ICCID)) or subscriber information (e.g., an international mobile subscriber identity (IMSI)).

The memory 230 can include at least one of an internal memory 232 and an external memory 234. The internal memory 232 can include at least one of, for example, a volatile memory (e.g., dynamic random access memory (DRAM), static RAM (SRAM), or synchronous dynamic RAM (SDRAM)), and a non-volatile memory (e.g., one time programmable read only memory (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 can include flash drive, for example, compact flash (CF), secure digital (SD), micro SD, mini SD, extreme digital (xD), multi-media card (MMC), or memory stick. The external memory 234 can be functionally or physically connected to the electronic device 201 through various interfaces.

The sensor module 240 can measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a bio sensor 240I, a temperature/humidity sensor 240J, an illumination sensor 240K, and an ultra violet (UV) sensor 240M. Additionally or alternately, the sensor module 240 can include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 can further include a control circuit for controlling at least one sensor therein. The electronic device 201, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of capacitive, resistive, infrared, and ultrasonic methods. Additionally, the touch panel 252 can further include a control circuit and a tactile layer to provide a tactile response to a user. The (digital) pen sensor 254 can include part of a touch panel or a sheet for recognition. The key 256 can include a physical button, a touch key, an optical key, or a keypad. The ultrasonic input device 258 can detect ultrasonic waves from an input means through a microphone 288 and check data corresponding to the detected ultrasonic waves.

The display 260 can include at least one of a panel 262, a hologram device 264, a projector 266, and/or a control circuit for controlling them. The panel 262 can be implemented to be flexible, transparent, or wearable. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen can be placed inside or outside the electronic device 201. The interface 270 can include an HDMI 272, a USB 274, an optical interface 276, or a d-subminiature (D-sub) 278. The interface 270 can be included in the communication interface 170 of FIG. 1. Additionally or alternately, the interface 270 can include a mobile high-definition link (MHL) interface, a SD card/MMC interface, or an Infrared Data Association (IrDA) standard interface.

The audio module 280 can convert sounds into electrical signals and convert electrical signals into sounds. At least some components of the audio module 280 can be included in the input/output interface 150 of FIG. 1. The audio module 280 can process sound information inputted or outputted through a speaker 282, a receiver 284, an earphone 286, or the microphone 288. The camera module 291, which can be used for capturing still images and videos, can include one or more image sensors (e.g., a front sensor or a rear sensor), a lens, an image signal processor (ISP), or a flash (e.g., an LED or a xenon lamp). The power management module 295 can manage the power of the electronic device 201.

The power management module 295 can include a power management IC (PMIC), a charger IC, or a battery gauge. The PMIC can have a wired and/or wireless charging method. The wireless charging method can include a magnetic resonance method, a magnetic induction method, or an electromagnetic method, and can further include an additional circuit for wireless charging, a coil loop, a resonant circuit, or a rectifier circuit. The battery gauge can measure the remaining capacity of the battery 296, or a voltage, current, or temperature of the battery 296 during charging. The battery 296 can include a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as digital multimedia broadcasting (DMB), digital video broadcasting (DVB), or mediaFlo™. Each of the above-described components of the electronic device 201 can be configured with at least one component and the name of a corresponding component can vary according to the kind of an electronic device. The electronic device 201 can be configured to include at least one of the above-described components or an additional component, or to not include some of the above-described components. Additionally, some of components in the electronic device 201 can be configured as one entity, so that functions of previous corresponding components can be performed identically.

Figure 3:
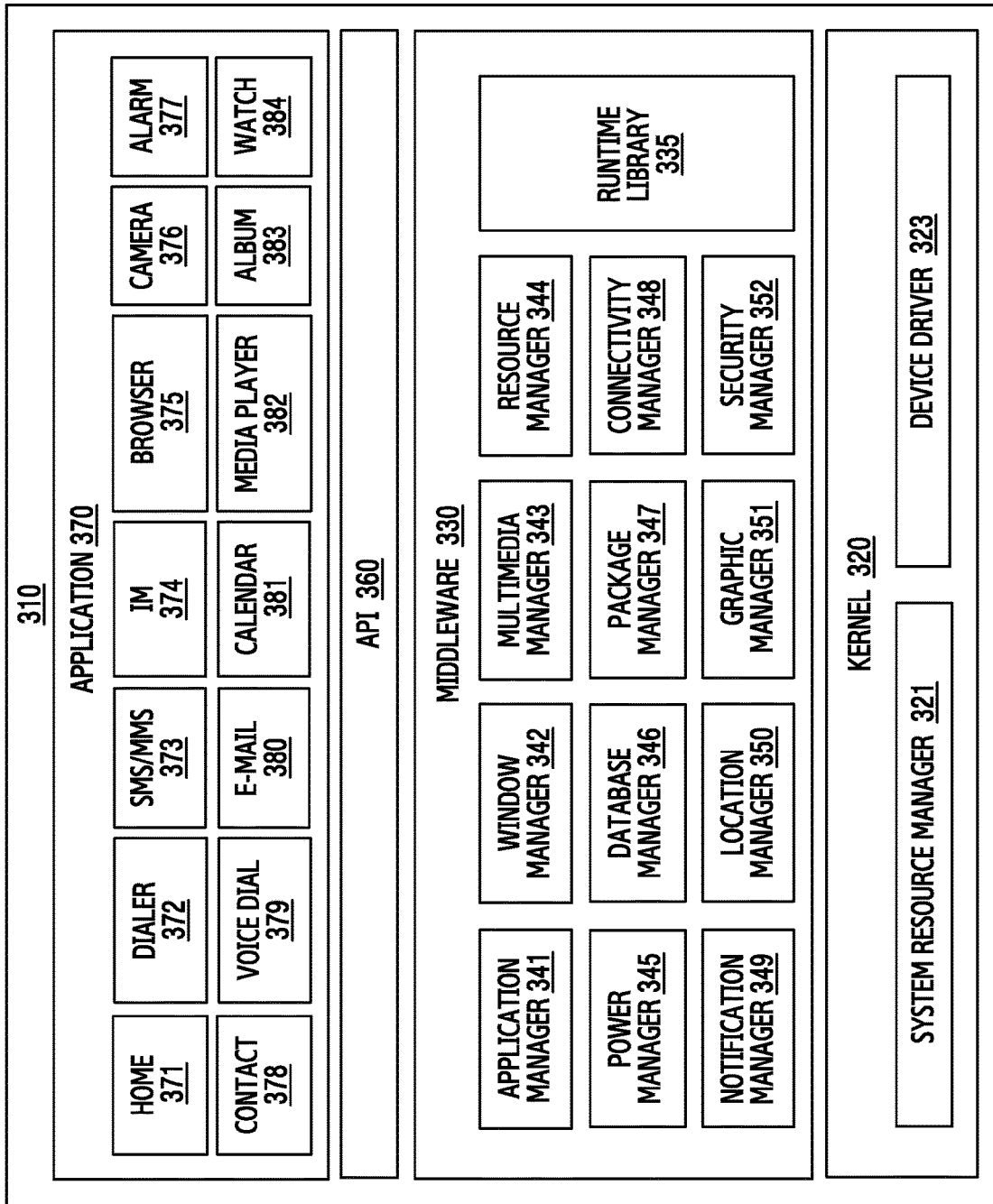
FIG. 3 is a block diagram of a program module, according to an embodiment of the present disclosure.

FIG. 3 is a block diagram of a program module 310, according to an embodiment of the present disclosure. The program module 310 can include an OS for controlling a resource relating to an electronic device and/or various applications running on the OS. The OS can include, for example, Android™, iOS™, Windows™, Symbian™, Tizen™, or Bada™. Referring to FIG. 3, the program module 310 can include a kernel 320, a middleware 330, an API 360, and/or an application 370. At least part of the program module 310 can be preloaded on an electronic device or can be downloaded from an external electronic device.

The kernel 320 includes at least one of a system resource manager 321 and/or a device driver 323. The system resource manager 321 can control, allocate, or retrieve a system resource. The system resource manager 321 can include a process management unit, a memory management unit, or a file system management unit. The device driver 323 can include a display driver, a camera driver, a BT driver, a sharing memory driver, a USB driver, a keypad driver, a WiFi driver, an audio driver, or an inter-process communication (IPC) driver. The middleware 330 can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include a library module used by a complier to add a new function through a programming language while the application 370 is running. The runtime library 335 can manage input/output, manage memory, or arithmetic function processing. The application manager 341 can manage the life cycle of the application 370. The window manager 342 can manage a graphical user interface (GUI) resource used in a screen. The multimedia manager 343 can recognize a format for playing various media files and encode or decode a media file by using the codec in a corresponding format. The resource manager 344 can manage a source code of the application 370 or a memory space. The power manager 345 can manage the capacity or power of the battery and provide power information for an operation of the electronic device. The power manager 345 can operate together with a basic input/output system (BIOS). The database manager 346 can create, search, or modify a database used in the application 370. The package manager 347 can manage installation or updating of an application distributed in a package file format.

The connectivity manger 348 can manage a wireless connection, and can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android™ or iSO™ can provide one API set for each platform, and Tizen™ can provide two or more API sets for each platform.

The application 370 can include at least one of a home application 371, a dialer application 372, an SMS/multimedia messaging system (MMS) application 373, an instant message application (IM) 374, a browser application 375, a camera application 376, an alarm application 377, a contact application 378, a voice dial application 379, an e-mail application 380, a calendar application 381, a media player application 382, an album application 383, a clock application 384, a health care (e.g., measure an exercise amount or blood glucose level), or environmental information (e.g., air pressure, humidity, or temperature information) provision application. The application 370 can include an information exchange application for supporting information exchange between the electronic device and an external electronic device. The information exchange application can include a notification relay application for relaying specific information to the external device or a device management application for managing the external electronic device. For example, the notification relay application can relay notification information from another application of the electronic device to an external electronic device, or receive and forward notification information from an external electronic device to the user. The device management application can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

A method and an electronic device described herein can provide location information suitable to user's context. Based on context information and a user's profile from a received question, the method and/or electronic device can provide a location where actual users having profiles similar with the user's profile often go, from data of the actual users who have used a recommendation location, thereby providing more suitable recommendation location data to a user.

Figure 4:
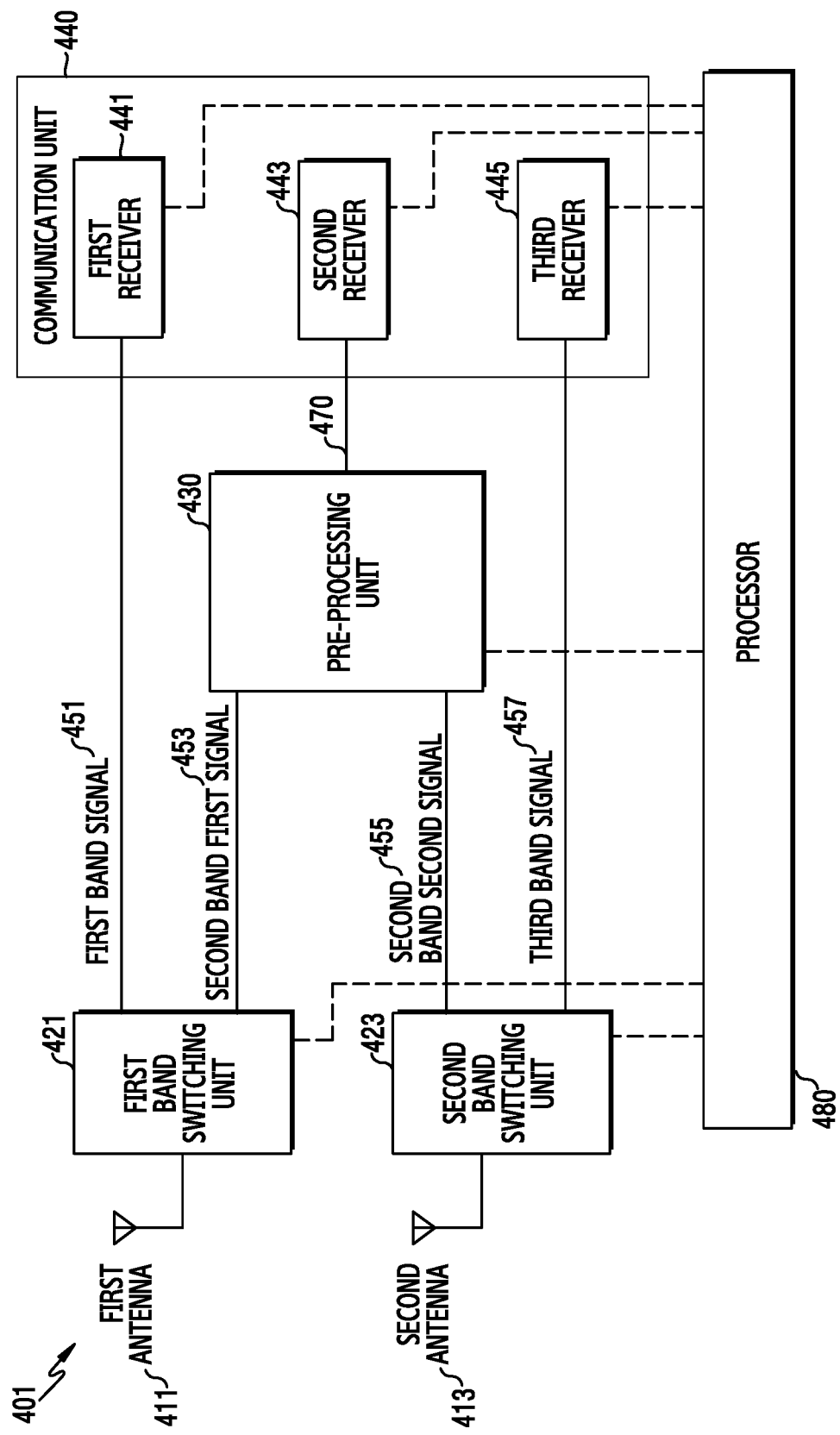
FIG. 4 is a diagram, of an electronic device, according to an embodiment of the present disclosure.

FIG. 4 is a diagram of an electronic device 401, according to an embodiment of the present disclosure. Hereafter, the phrase part or unit can indicate a unit for processing at least one function or operation, and can be implemented using hardware, software, or a combination of hardware and software.

Hereinafter, terms indicating control information (e.g., control signals), terms indicating operation states (e.g., operations, configurations), terms indicating data (e.g., signals, values), terms indicating network entities, terms indicating messages (e.g., requests), and terms indicating components of a device are mentioned for the sake of explanation. Accordingly, the present disclosure is not limited to the terms used herein, and other terms indicating objects having technically identical meanings can also have been used.

The electronic device 401 can be a portable electronic device, and can include one of a smart phone, a portable terminal, a mobile phone, a mobile pad, a media player, a tablet computer, a phablet, a handheld computer, and a PDA. The electronic device 401 can be a device combining two or more functions of those devices.

The electronic device 401 can include a plurality of antennas, a plurality of band switching units, a pre-processing unit, a communication unit, and a processor. The antennas can be operatively coupled with the band switching units. The pre-processing unit can be operatively coupled with at least two of the band switching units. The communication unit can be operatively coupled with the pre-processing unit. Also, the communication unit can be operatively coupled with other band switching units, other than the at least two band switching units. The processor can be operatively coupled with the band switching units, the pre-processing unit, and the communication unit. The communication unit can include a plurality of receivers. The processor can control the band switching units, the pre-processing unit, and the communication unit using control signals.

The processor can send the control signal based on carrier aggregation (CA) band combination, to the band switching units, the pre-processing unit, and the communication unit. The CA band combination can be defined as a combination of frequency bands covering a plurality of component carriers (CCs). For example, when a first CC is included in a B2 band and a second CC is included in a B4 band, the CA band combination can be B2+B4. The first CC can be referred to as a primary CC (PCC). The second CC can be referred to as a secondary CC (SCC). Although the CCs are included in the same frequency bands, the combination can differ according to which frequency band the PCC belongs to. For example, a B2+B4 CA band combination where the PCC is the B2 band and the SCC is the B4 band can be different from a B4+B2 CA band combination where the PCC is the B4 band and the SCC is the B2 band.

Referring to FIG. 4, the electronic device 401 can include a plurality of antennas. The antennas can include a first antenna 411 and a second antenna 413. The antennas each can forward a signal received from other electronic device to the band switching unit. For example, the first antenna 411 can forward a signal received from the other electronic device to a first band switching unit 421, and the second antenna 413 can forward a signal received from the other electronic device to a second band switching unit 423.

At least one of the antennas can transmit the signal received from the band switching unit connected with at least one of the antennas, to the other electronic device. When the electronic device 401 includes a transmission path for the at least one antenna, the electronic device 401 can receive a signal and concurrently send a signal via one antenna in the same time resource. That is, the electronic device 401 can support a frequency division duplexing (FDD) communication system which can conduct uplink communication and downlink communication in the same time resource. The electronic device 401 may also support a time division duplexing (TDD) communication system which conducts the uplink communication and downlink communication in the same frequency resource.

While the electronic device 401 includes the two antennas in FIG. 4, the present disclosure is not limited to the two antennas. For example, the electronic device 401 can include four antennas. Specifically, in addition to a main antenna of a particular band, the electronic device 401 supporting CA can include a third antenna and a fourth antenna as additional antennas for diversity of the particular band. For example, the electronic device 401 can include the first antenna 411 as a main antenna of a first band (e.g., B2) and the third antenna for the diversity of the first band, and include the first antenna 411 and the second antenna 413 as main antennas of a second band (e.g., B4) and the fourth antenna for the diversity of the second band.

The electronic device 401 can include a plurality of band switching units. For example, the band switching units can include the first band switching unit 421 and the second band switching unit 423. Hereafter, it is assumed that the first band switching unit 421 can select one of the first band and the second band, and the second band switching unit 423 can select one of the second band and the third band. For example, the first band can include the B2 band (uplink (UL): 1850-1910 MHz, downlink (DL): 1930-1990 MHz), the second band can include the B4 band (UL: 1710-1755 MHz, DL: 2110-2155 MHz), and the third band can include a B30 band (UL: 2305-2315 MHz, DL: 2350-2360 MHz).

The band switching units each can separate a particular band signal from the signal received from their connected antenna. The signals received from the antennas connected to the band switching units respectively include noise and signals of different frequency characteristics. Accordingly, the band switching units each can select a particular frequency band, filter and amplify only the selected frequency band, and thus separate the signal of the selected frequency band from the received signal. For example, the first band switching unit 421 can select a frequency filter corresponding to the first band among a plurality of filters and separate a signal corresponding to the first band from the signal received from the first antenna 411, according to the selected frequency filter. The separated signal can be a first band signal 451. The second band switching unit 423 can select a frequency filter corresponding to the second band among the filters and separate a signal corresponding to the second band from the signal received from the second antenna 413, according to the selected frequency filter. The separate signal can be a second band second signal 455. The separated signals (e.g., the first band signal 451, a second band first signal 453, the second band second signal 455, and a third band signal 457) are all RF signals.

The band switching units each can select the particular frequency band under control of the processor 480. More particularly, the processor 480 can send a signal indicating a band to receive, to the band switching units; the band to receive can be referred to as a CA band combination.

According to settings of the electronic device 401, the processor 480 can configure the CA band combination. For example, the electronic device 401 can be a terminal which supports CA with a combination of the first band, the second band, and the third band. Depending on locations of two CCs, the processor 480 can configure an inter-band CA combination and an intra-band CA combination. As the inter-band CA, the processor 480 can configure a combination of a first inter-band CA, a second inter-band CA, and a third inter-band CA. The processor 480 can configure one, as the inter-band CA, of an inter-band CA combination where the PCC is the first band and the SCC is the second band (hereafter, referred to as a first band+second band CA), a second band+first band CA combination, a second band+third band CA combination, and a third band+second band CA combination.

Operations of the electronic device 401 are now described based on 1UL/2DLs CA.

The processor 480 can select one of the CA band combinations and thus generate a control signal for controlling configurations of the band switching units. The selection can be sequentially conducted in a preset order, or the selection can be executed according to information received from a network provider. The selection may also be conducted according to a user's setting.

The processor 480 can select one of the band combinations for the inter-band CA and send a control signal to a corresponding band switching unit. For example, since the second antenna 413 cannot be used in the first band of the first inter-band CA, the processor 480 can send a control signal instructing the first band switching unit 421 to operate in the first band. In the second inter-band CA, both of the first antenna 411 and the second antenna 413 can be used in the same time resource in the second band, and the processor 480 can send control signals instructing both of the first band switching unit 421 and the second band switching unit 423 to operate in the second band. In the third inter-band CA, since the first antenna 411 cannot be used in the third band, the processor 480 can send a control signal instructing the second band switching unit 423 to operate in the third band.

The processor 480 can send the control signal to at least one band switching unit according to the combination selected from the inter-CA band combinations. For example, when the first band+second band CA is selected, the first antenna 411 is required to send a signal of the first band, which is the PCC, and the electronic device 401 can use the second antenna 413 to receive a signal of the second band. Hence, the processor 480 can send the control signals such that the first band switching unit 421 selects the first band and the second band switching unit 423 selects the second band.

When the second band+first band CA is selected, the first antenna 411 can send a signal of the second band which is the PCC, and the electronic device 401 can receive a signal of the second band using the first antenna 411. Also, since the second antenna 413 is not used to receive the first band signal, the electronic device 401 may use the second antenna 413 to receive the second band signal. That is, the electronic device 401 can receive the second band signal using both of the first antenna 411 and the second antenna 413. Thus, the processor 480 can send control signals such that both of the first band switching unit 421 and the second band switching unit 423 select the second band. When the first band switching unit 421 includes a diplexer or a duplexer, the electronic device 401 may receive the second band signal and the first band signal using the first antenna 411. The diplexer or the duplexer can include a filter which separates a DL frequency of the first band and a DL frequency of the second band. For example, the diplexer can include a high pass filter and a low pass filter configured to separate 1930-1990 MHz and 2110-2155 MHz.

When the second band+third band CA is selected, the first antenna 411 can send a signal of the second band which is the PCC, and the electronic device 401 can receive a signal of the second band using the first antenna 411. However, since the use of the second antenna 413 is required to receive a third band signal, the electronic device 401 cannot use the second antenna 413 to receive the second band signal. That is, the electronic device 401 can receive the second band signal using the first antenna 411. Hence, the processor 480 can send control signals such that the first band switching unit 421 selects the second band and the second band switching unit 423 selects the third band. Although not depicted in FIG. 4, the electronic device 401 can receive the second band signal using the fourth antenna, instead of the second antenna 413, for reception diversity. In doing so, the processor 480 can generate a control signal such that a band switching unit connected to the fourth antenna selects the second band, and send the generated control signal to the band switching unit connected to the fourth antenna.

For example, when the third band+second band CA is selected, the electronic device 401 can send a signal of the third band using a third antenna. The electronic device 401 can receive the third band signal using the third antenna as the main antenna, and receive the third band signal using the second antenna 413 as the additional antenna for reception diversity. That is, since the second band switching unit 423 connected to the second antenna 413 is configured for the third band, the electronic device 401 uses the first antenna 411 to receive the second band signal. Hence, the processor 480 can send control signals such that the first band switching unit 421 selects the second band and the second band switching unit 423 selects the third band.

The above-stated examples are summarized in Table 1.

TABLE 1

| Band | First band | Second band | Third band | 1 + 2 CA | 2 + 1 CA | 2 + 3 CA | 3 + 2 CA |
|---|---|---|---|---|---|---|---|
| Example | B2 | B4 | B30 | B2 + B4 | B4 + B2 | B4 + B30 | B30 + B4 |
| First Antenna | ○ | ○ | X | B2 | B2 + B4 | B4 | B4 |
| Second Antenna | X | ○ | ○ | B4 | B4 | B30 | B30 |

The antennas are different in their performance, and the reception performance of the electronic device 401 can differ depending on which frequency band the signals of each antenna are filtered into. Alternatively, based on whether the band switching units include the diplexer or the duplexer, the antenna used for the CA band combination can vary. Hence, to enhance the reception performance, the electronic device 401 may recognize the connection of the antenna and a particular band based on the CA band combination as shown in Table 1, before configuring the path.

The band switching units each can send the signal separated based on the selected band, to the communication unit 440. Some of the band switching units can forward the signal separated based on the selected band, to the communication unit 440 via the pre-processing unit 430. The first band switching unit 421 can forward the second band first signal 453 separated in the second band selection, to the pre-processing unit 430, and the second band switching unit 423 can forward the second band second signal 455 separated in the second band selection, to the pre-processing unit 430. That is, the pre-processing unit 430 can be configured to process the signals of the second band.

The pre-processing unit 430 can process the second band first signal 453 and the second band second signal 455, and the pre-processing unit 430 can configure paths of the second band first signal 453 and the second band second signal 455. The pre-processing unit 430 can also apply a weight fact to the second band first signal 453 and the second band second signal 455 received according to their paths. The weight factor can be defined as a ratio of a second path weight to a first path weight $$\left(\frac{\text{second path weight}}{\text{first path weight}}\right)$$

in the pre-processing unit 430. The pre-processing unit 430 can generate a signal 470 by combining the second band first signal 453 and the second band second signal 455 with the weight factor applied. In other words, the pre-processing unit 430 can generate the signal 470 by processing the second band first signal 453 and the second band second signal 455 based on the weight factor. The weight factor can be referred to as a combining gain, a weighting element, a weighting value, or a weighting ratio.

The pre-processing unit 430 can configure the paths of the second band first signal 453 and the second band second signal 455 under control of the processor 480. The pre-processing unit 430 can include a plurality of transmission paths, and a set of transmission paths can be referred to as a path combination. The pre-processing unit 430 can match paths of one path combination to the band switching units under control of the processor 480, and the pre-processing unit 430 can connect an output of one band switching unit to one path under control of the processor 480.

The processor 480 can configure a plurality of path combinations based on the number of signals received at the pre-processing unit 430. The processor 480 can send a control signal indicating a particular path combination to the pre-processing unit 430. For example, when receiving the second band first signal 453 and the second band second signal 455 from the first band switching unit 421 and the second band switching unit 423, the processor 480 can configure two path combinations with a direct mode and a cross mode. The direct mode can be the path combination which connects a first input to a first output and a second input to a second output sequentially. For example, when the direct mode is selected, the processor 480 can send a control signal to connect the second band first signal 453 to the first path and the second band second signal 455 to the second path. Conversely, the cross mode can be the path combination which crosses the first input to the second output and the second input to the first output. For example, when the cross mode is selected, the processor 480 can send a control signal to connect the second band first signal 453 to the second path and the second band second signal 455 to the first path.

The transmission paths can be configured to apply a predetermined weight. The weight factor can differ according to the performance of the first antenna 411 and the second antenna 413. For example, when a gain of the second antenna 413 is higher than a gain of the first antenna 411 by 3 dB, the weight factor of the first antenna 411 can be set to 2 to double the path gain. Based on the operation mode, the electronic device 401 can compensate for the insufficient gain of the first antenna 411 with the weight factor.

Owing to the antenna gain difference between the first antenna 411 and the second antenna 413, the weight factor can be set to a value other than 1. The antenna gain difference can cause the performance difference between a case where the electronic device 401 receives the second band signal using only the first antenna 411 among the first antenna 411 and the second antenna 413 (e.g., the second band+third band CA) and a case where the electronic device 401 receives the second band signal using only the second antenna 413 (e.g., the first band+second band CA). In other words, when receiving the second band signal using the second antenna 413, the electronic device 401 can attain a higher reception gain when compared to just using the first antenna 411.

When the weight factor is 2 and the electronic device 401 uses the first antenna 411 in the direct mode, the pre-processing unit 430 applies a combination gain 1 to the second band first signal 453. Since the reception gain for the first antenna 411 is lower than the reception gain for the second antenna 413, the pre-processing unit 430 can be required to apply the combination gain 2 to the second band first signal 453 for the sake of better reception performance. Thus, when receiving the second band signal via the first antenna 411, the processor 480 can send a control signal to the pre-processing unit 430 to operate in the cross mode, rather than the direct mode. At the control signal, the pre-processing unit 430 can increase the combination gain of the output signal.

By applying the higher weight factor to the better antenna when both of the first antenna 411 and the second antenna 413 are used (e.g., the second band+first band CA, the second inter-band CA), the electronic device 401 can achieve a higher reception performance when compared to just using only the second antenna 413 of the first antenna 411 and the second antenna 413.

When the processor 480 selects one path combination of the direct mode and the cross mode, path configurations for optimizing the reception performance based on the CA band combination are shown in Table 2. As mentioned earlier, the diplexer can be connected to the first antenna 411. For example, when the diplexer, instead of a switch, is connected to the first antenna 411, the B2 band signal and the B4 band signal can be received at the same time.

TABLE 2

| Band | First band | Second band | Third band | 1 + 2 CA | 2 + 1 CA | 2 + 3 CA | 3 + 2 CA |
|---|---|---|---|---|---|---|---|
| Example | B2 | B4 | B30 | B2 + B4 | B4 + B2 | B4 + B30 | B30 + B4 |
| First Antenna | ○ | ○ | X | B2 | B2 + B4 | B4 | B4 |
| Second Antenna | X | ○ | ○ | B4 | B4 | B30 | B30 |
| Operation Mode | Direct | Direct | Direct | Direct | Direct | Cross | Cross |

The electronic device 401 can include the communication unit 440, which can include a first receiver 441, a second receiver 443, and a third receiver 445. While the receiver for processing the received signal is described herein, a separate receiver and all or part of one transceiver can also be used.

The first receiver 441 can process the received first band signal 451 under control of the processor 480. More specifically, the first receiver 441 can down-convert the first band signal 451 which is an RF signal, to a baseband signal. For example, the first receiver 441 can include an amplifier, a mixer, an oscillator, or an analog-to-digital converter (ADC). The first receiver 441 can demodulate and decode the baseband signal, and can thus restore a received bit stream. The second receiver 443 and the third receiver 445 each can include the same or similar structure as the receiver 441.

In FIG. 4, the operations of the processor 480 are conducted independently of the signal reception. As such, separately from the signal reception via the antenna, the processor 480 can configure the filter to select a particular band, configure the path to increase the signal gain of the particular band, or adjust the ratio of the combination gain. The electronic device 401 can conduct such configurations before signal reception.

While it has been described herein that the processor 480 controls the components (e.g., first antenna 411, the second antenna 413, etc.) of the electronic device 401, the aforementioned operations may be executed by one or more other components of the electronic device 401. For example, the electronic device 401 may perform designated operations using passive components.

According to an embodiment of the present disclosure, the electronic device can include a first antenna for a first band and a second band, a second antenna for the second band and a third band, and a pre-processing unit configured to generate, based on identifying a frequency band of a first signal received via the first antenna and a frequency band of a second signal received via the second antenna are the second band, a pre-processed signal by combining the first signal and the second signal based on a ratio of a weight factor, and to transmit the pre-processed signal to a first RF receiver.

The electronic device can transmit, to a second RF receiver, a third signal of the first band received via the first antenna, and perform a CA by using the pre-processed signal transmitted to the first RF receiver and the third signal transmitted to the second RF receiver.

The electronic device can transmit, to a third RF receiver, a fourth signal of the third band received via the second antenna, and perform a CA by using the third signal transmitted to the second RF receiver, the fourth signal transmitted to the third RF receiver, and the pre-processed signal transmitted to the first RF receiver.

The pre-processing unit can include a path configuration unit configured to select one of a first path and a second path which are included in the pre-processing unit as a reception path for the first signal and to select another of the first path and the second path as a reception path for the second signal, and a combiner configured to generate the pre-processed signal by combining the first signal and the second signal which pass through the selected paths.

The path configuration can select, based on identifying that the frequency band of the first signal and the frequency band of the second signal are not the second band, the first path as the reception path for the second signal, and select, based on identifying that the frequency band of the second signal is the second band, the first path as the reception path for the first signal and the second path as the reception path for the second signal.

The weight factor can be defined as a weight ratio of the second path to the first path, and is determined by including a difference between an antenna gain of the first antenna and an antenna gain of the second antenna.

The combiner can include at least one resistor having a value determined according to the weight factor, at least one capacitor, and at least one inductor.

The at least one capacitor can include at least one variable capacitor adaptively adjusted based on the weight factor, and the at least one inductor can include at least one variable inductor adaptively adjusted based on the weight factor.

The electronic device can further include a first LNA configured to amplify the first signal and a second LNA configured to amplify the second signal. The pre-processing unit can generate the pre-processed signal by combining the amplified first signal and the amplified second signal.

The electronic device can further include a compensation unit configured to compensate the pre-processed signal based on a designated calibration offset value, the designated calibration offset value can correspond to a specific path configuration among a plurality of calibration offset values, and the specific path configuration can correspond to the frequency band of the first signal and the frequency band of the second signal among a plurality of path configurations which are determined based on the first path and the second path included in the pre-processing unit and a combination between one of the first band, the second band, and the third band and the second band.

According to an embodiment of the present disclosure, an electronic device can include a first antenna for a first band and a second band, a second antenna for the second band and a third band, and an analog combiner configured to receive a first signal of the second band via the first antenna and receive a second signal of the second band via the second antenna, to generate, based on the receiving, a third signal for obtaining a diversity gain by combining the first signal and the second signal based on a ratio which is determined by an impedance value of each of impedance elements included in the analog combiner, and to provide the third signal to a receiver. Information included in the first signal can correspond to information included in the second signal.

FIG. 4 illustrates an RF front end of the electronic device 401, that is, the structure before the RF signal is fed to the RF receiver. Hereinafter, specific structures of the band switching unit and the pre-processing unit, of the RF front end, and how these components function under the control of the processor 480 are explained in FIG. 5A through FIG. 8.

Figure 5A:
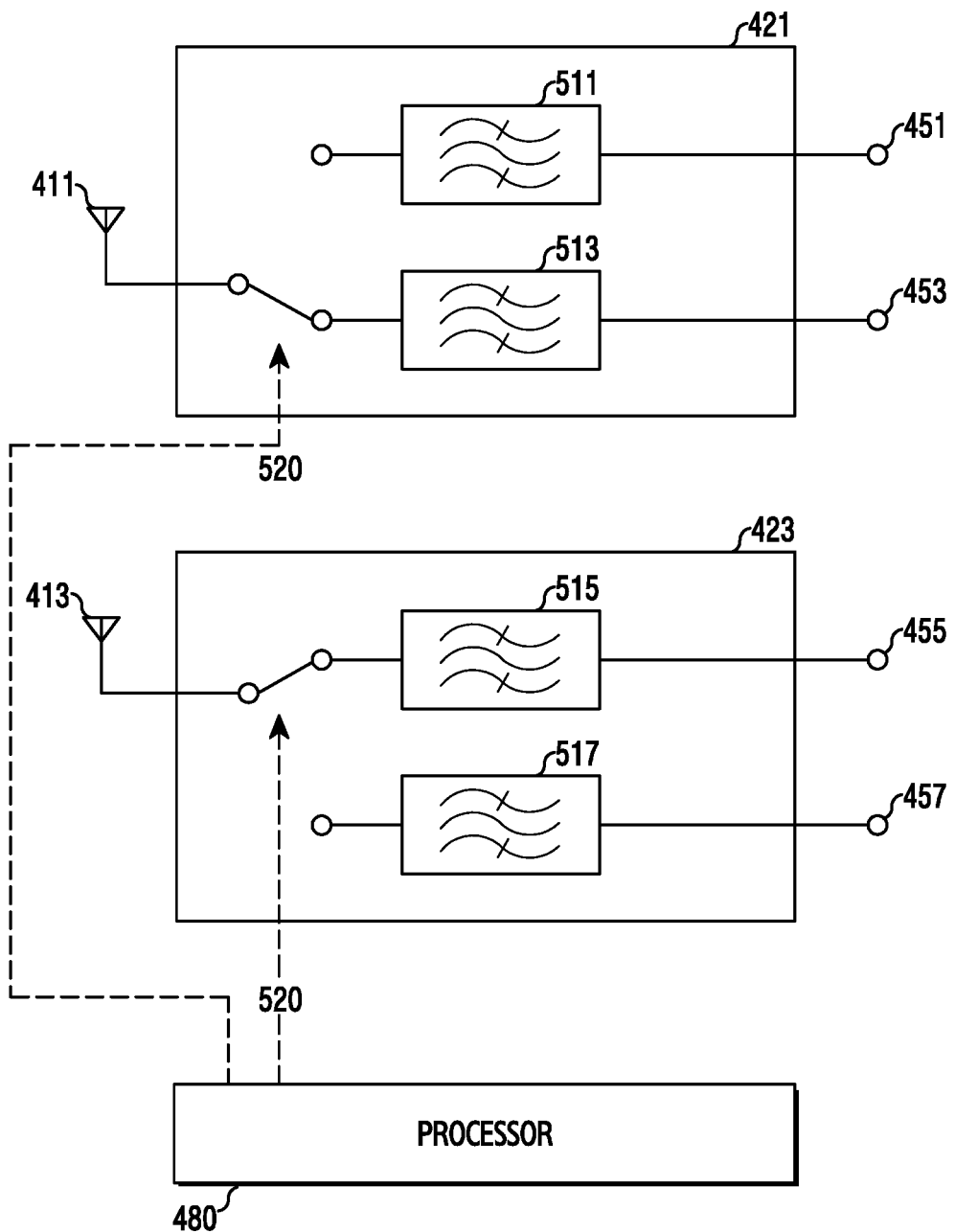
FIG. 5A is a diagram of a band switching unit, according to an embodiment of the present disclosure.

FIG. 5A is a diagram of a band switching unit, according to an embodiment of the present disclosure. The band switching unit can be the first band switching unit 421 or the second band switching unit 423.

The first band switching unit 421 can include a first filter 511 and a second filter 513. The first filter 511 can be a filter for the first band, and can pass signals in the 1930~1990 MHz band to separate B2 band signals from signals received from the first antenna 411. The second filter 513 can be a filter for the second band, and can pass signals in the 2110~2155 MHz band to separate the B4 band from signals received from the first antenna 411.

The second band switching unit 423 can include a third filter 515 and a fourth filter 517. The third filter 515 can be a filter for the second band, and can pass signals in the 2110~2155 MHz band to separate B4 band signals from signals received from the second antenna 413. The fourth filter 517 can be a filter for the third band, and can pass signals in the 2350~2360 MHz band to separate the B30 band from signals received from the second antenna 413.

The processor 480 can control the first band switching unit 421 and the second band switching unit 423, and the processor 480 can send a control signal 520 to the first band switching unit 421 and the second band switching unit 423 according to a CA band combination. For example, when the second band+first band CA is selected, the use of the first antenna 411 is required to send a signal of the second band which is the PCC, and the electronic device 401 can receive a signal of the second band using the first antenna 411. Also, since the second antenna 413 is not used to receive the first band signal, the electronic device 401 may receive the second band signal using the second antenna 413. Thus, the processor 480 can send the control signal 520 to the first band switching unit 421 and the second band switching unit 423 to receive the second band signal. The first band switching unit 421 can be implemented using one chip (or an SoC) including a band filter and a band duplexer.

As shown in FIG. 5A, one antenna can be connected to the filter for passing signals of a particular frequency band. The one antenna, which is connected to the filter for passing the signals of the particular frequency band, cannot be connected with other frequency bands. That is, the electronic device 401 cannot receive other frequency band signals than the particular frequency band, using the one antenna. For example, when the first antenna 411 is connected to the first filter 511 (e.g., a frequency band filter), the electronic device 401 can send and receive signals of the first band via the first antenna 411, but cannot receive signals of the second band via the first antenna 411; this is because each filter includes only a single filter.

In some instances, it may prove advantageous to connect one antenna with three or more frequency band filters.

The electronic device 401 can further include a third antenna and a fourth antenna in addition to the first antenna 411 and the second antenna 413. The third antenna can be an antenna for reception diversity of the first band and the second band. The fourth antenna can be an antenna for reception diversity of the second band and the third band. The third antenna can be connected to the first filter 511 (e.g., a frequency band filter) and the second filter 513, and the fourth antenna can be connected to the second filter 513 and the third filter 515. For example, the electronic device 401 can perform a reception diversity operation by concurrently receiving the first band or second band signals via the first antenna 411 and the third antenna, and the electronic device 401 can perform the reception diversity operation by concurrently receiving the second band or third band signals via the second antenna 413 and the fourth antenna.

The electronic device 401 can further include a third antenna and a fourth antenna in addition to the first antenna 411 and the second antenna 413. The third antenna can be an antenna for reception diversity of the first band and the third band. For the reception diversity operation, the third antenna can be connected to the first filter 511 and the third filter 513, and the electronic device 401 can perform the reception diversity operation by concurrently receiving the third band signal via the second antenna 413 and the third antenna. The fourth antenna can be an antenna for the reception diversity of the first band and the second band. For the reception diversity, the fourth antenna can be connected to the first filter 511 and the second filter 513. For example, the electronic device 401 can perform the reception diversity operation which receives the first band or second band signals in the same time source via the first antenna 411 and the fourth antenna.

As such, the electronic device 401 can have antennas that are connected to the filters of the band switching unit, and the filters can select the CA band combination according to the control signal received from the processor 480. That is, regardless of the signal received from the antenna, the processor 480 can pre-select the CA band combination for the received signal in a designated order or according to a network provider's command. Since the characteristics of the filter do not change and one of the filters is identified and connected to the antenna, the processor 480 can pre-configure the path of the RF signal to receive according to the pre-selected CA band combination. Independently of the signal reception, the processor 480 can set the paths in the pre-processing unit, the weight factor, the antenna gain, a calibration offset value, or simulation results according to the selected CA band combination, to be explained.

Figure 5B:
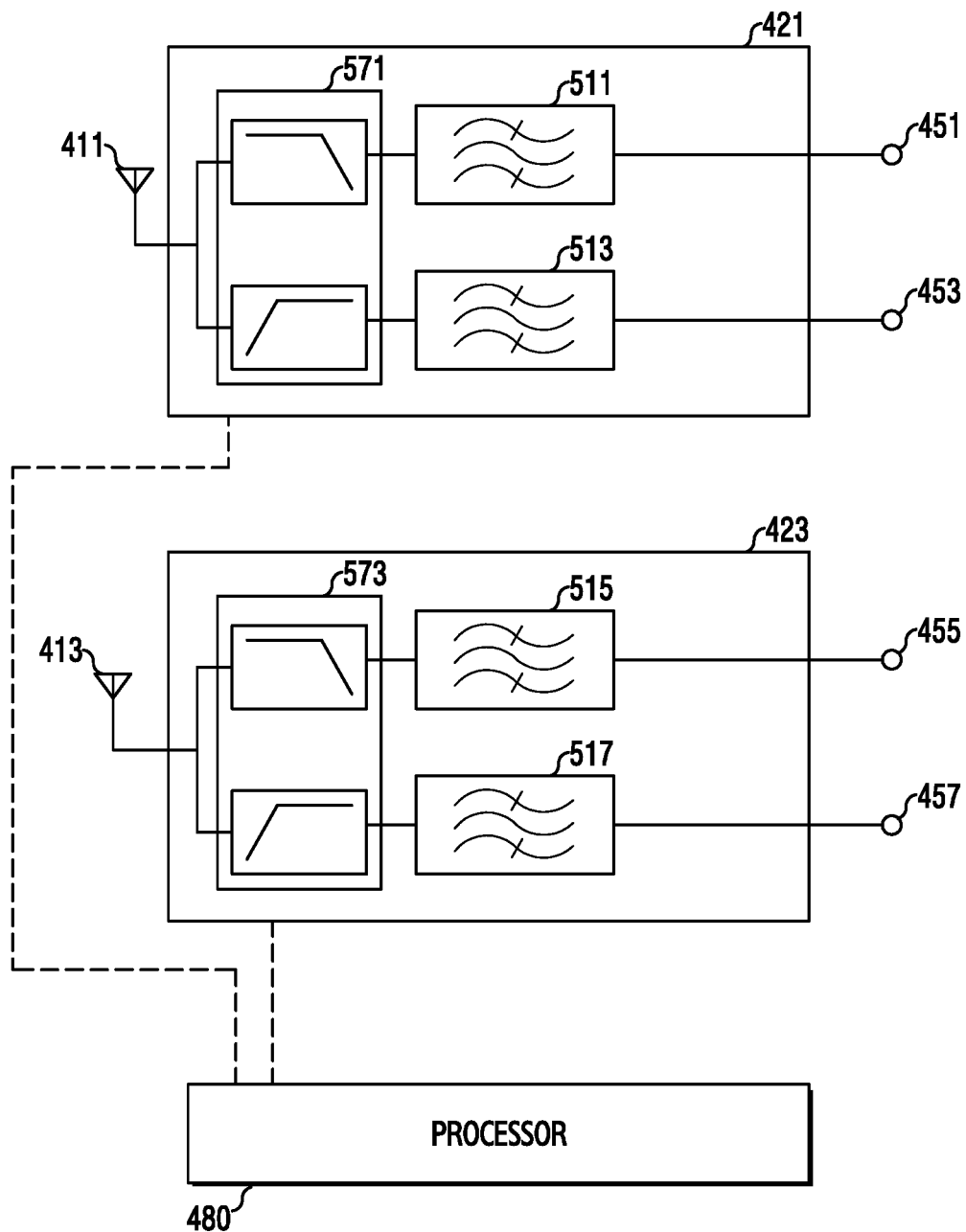
FIG. 5B illustrates is a diagram of a band switching unit, according to an embodiment of the present disclosure.

FIG. 5B is a diagram of a band switching unit, according to an embodiment of the present disclosure. The band switching unit can be the first band switching unit 421 or the second band switching unit 423.

The first band switching unit 421 can include a diplexer 571. While the diplexer is described herein, corresponding operations can be equally applied to a duplexer.

The first band switching unit 421 can include the first filter 511 and the second filter 513. The first filter 511 can be a filter for the first band, and the second filter 513 can be a filter for the second band. For example, the first filter 511 can pass signals in the 1930~1990 MHz band, and the second filter 513 can pass signals in the 2110~2155 MHz band.

The diplexer 571 can include a plurality of filters for forwarding a signal received from the antenna 411 to the first filter 511 and the second filter 513. For example, the filters can include a low pass filter which passes a frequency below 1990 MHz, and a high pass filter which passes a frequency over 2110 MHz.

Although not depicted in FIG. 5B, the diplexer 571 (or the duplexer) may be connected to a transmit filter which passes B2 band signals and a transmit filter which passes B4 band signals. The duplexer can include a band pass filter for each frequency band.

The second band switching unit 423 can include a diplexer 573. Operations of the diplexer 573 can be equally applied to the duplexer.

The second band switching unit 423 can include the third filter 515 and the fourth filter 517. The third filter 515 can be a filter for the second band, and the fourth filter 517 can be a filter for the third band. For example, the third filter 515 can pass signals in the 2110~2155 MHz band, and the fourth filter 517 can pass signals in the 2350~2360 MHz band.

The diplexer 573 can include a plurality of filters for forwarding a signal received from the antenna 413 to the third filter 515 and the fourth filter 517. For example, the filters can include a low pass filter which passes signals in a frequency below 2155 MHz, and a high pass filter which passes signals in a frequency over 2350 MHz.

As shown in FIG. 5B, the diplexer can be connected to the filters for passing signals of a particular frequency band. The diplexer can forward a signal received from one antenna to the filters. The diplexer, which is connected to the filters, can perform the combination operation in the CA operation. For example, in the second band+first band CA, the electronic device 401 can receive the signal from the antenna 411 as the first band signal 451 and the second band first signal 453.

As such, regardless of the signal received from the antennas, an intended CA band combination can be identified according to the preset filter setting of the diplexer or the duplexer. While the receive filter is illustrated, the filters of the diplexer or the duplexer may be connected to a transmit filter. Since the frequency band depends on whether the signal of the particular band is transmitted or received, that is, according to the UL or the DL, the filters of the diplexer or the duplexer can be configured to operate differently.

The first band, the second band, and the third band are, but not limited to, B2, B4, and B30 in FIG. 5A and FIG. 5B. That is, the first band, the second band, and the third band each may be a frequency band corresponding to one of intermediate bands B3 (UL: 1710-1785 MHz, DL: 1805-1880 MHz), B 10 (UL: 1710-1770 MHz, DL: 2110-2170 MHz), B23 (UL: 2000-2020 MHz, DL: 2080-2200 MHz), and B25 (UL: 1850-1915 MHz, DL: 1930-1995 MHz).

Figure 6:
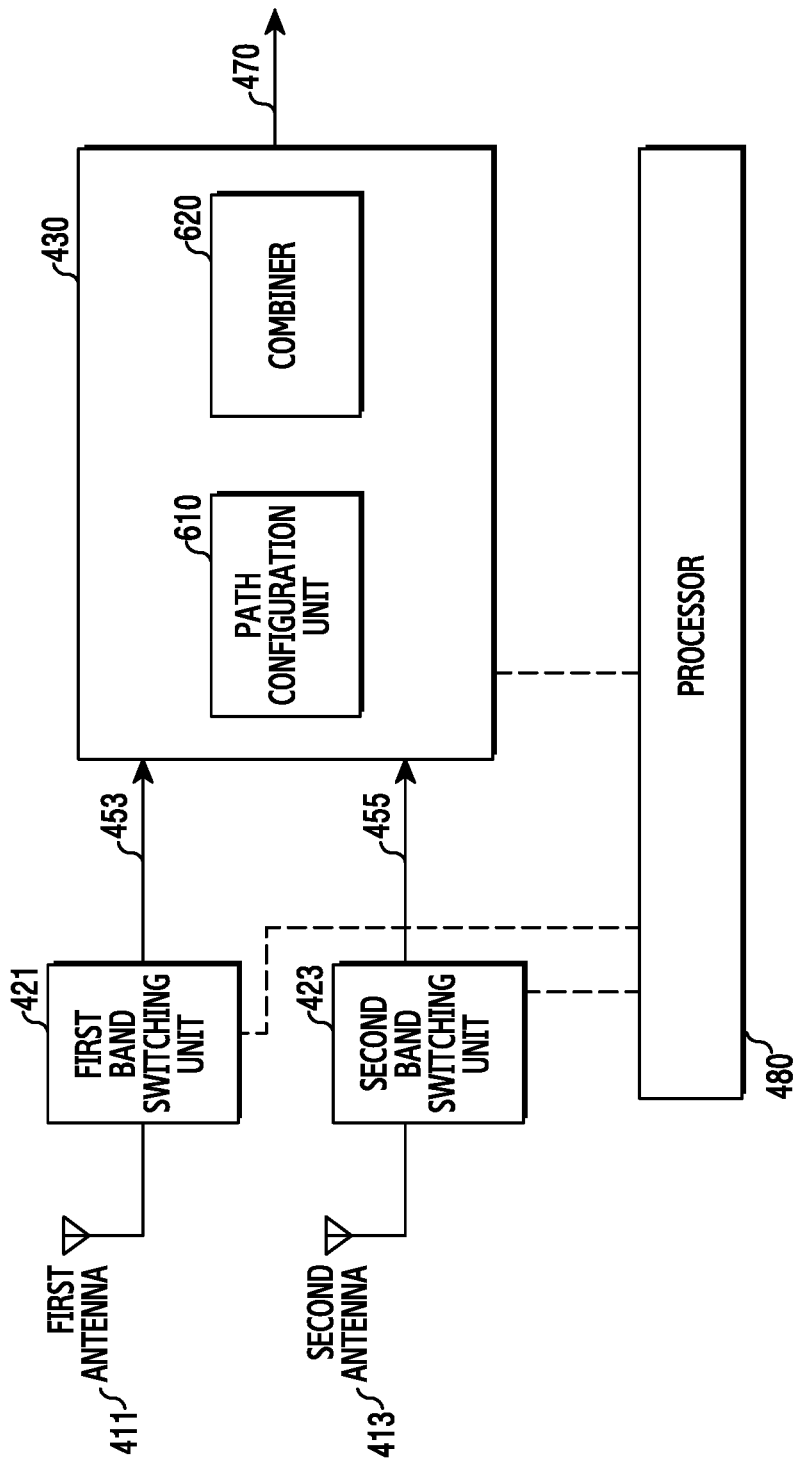
FIG. 6 is a diagram of a pre-processing unit, according to an embodiment of the present disclosure.

FIG. 6 is a diagram of a pre-processing unit, according to an embodiment of the present disclosure. The pre-processing unit can be the pre-processing unit 430 of FIG. 4.

The pre-processing unit 430 can include a path configuration unit 610 and a combiner 620. The pre-processing unit 430 can receive two signals (e.g., a signal 453 and a signal 455) from the first and second band switching units 421, 423. The pre-processing unit 430 can output a signal 470. The signal 470 can be pre-processed. While the two inputs and one output are depicted in FIG. 6, the number of the inputs and the outputs can vary according to the CA type and the configuration of the filters connected to antennas in the receiver. For example, the pre-processing unit 430 may receive three input signals and output one signal.

The path configuration unit 610 can configure various paths under control of the processor 480. The path configuration unit 610 can match its input signals to paths of the combiner 620. The input signals of the path configuration unit 610 are RF signals separated as particular band signals in the band switching units. The particular band can be a band for the pre-processing unit 430. For example, the particular band can be the B4 band.

The path configuration unit 610 can receive a control signal indicating a particular one of path combinations from the processor 480. The path combinations can be determined by the number of band switching units connected to the pre-processing unit 430. For example, if it is assumed that RF signals are received from four band switching units, two of the received RF signals are first band signals, and the other two RF signals are second band signals. That is, when the pre-processing unit 430 is configured to combine signals for two bands, two cases of a direct mode and a cross mode are possible per band, and the number of the path combinations can be four (=2×2). For example, when three RF signals are received using a 3DLs CA scheme, the number of the path combinations can be six (=3×2×1).

The processor 480 can select the path combination according to the selected CA band combination. The processor 480 can identify a path combination corresponding to the selected CA band combination among the multiple path combinations based on a predefined table. For example, based on Table 2, the processor 480 can identify a path combination corresponding to the selected CA band combination among the multiple path combinations. The processor 480 can send a control signal indicating the identified path combination to the path configuration unit 610; the path combinations can be indexed, and the control signal can indicate the index.

For example, the input signals can include the signal 453 and the signal 455, and the particular band can be the second band B3 of FIG. 4. The combiner 620 can include a first path and a second path. The first path and the second path can have different combination gains. The path configuration unit 610 can configure the paths in a corresponding mode according to whether the control signal received from the processor 480 indicates the direct mode or the cross mode as shown in Table 2. When the control signal indicates the index corresponding to the cross mode, the path configuration unit 610 can cross and connect the signal 453 to the second path and the signal 455 to the first path.

The path configuration unit 610, which provides the two paths to the received two inputs, can include a double pole double throw (DPDT) switch. However, as the number of the inputs and the number of the paths can vary, the path configuration unit 610 may further include a switch of the same or different type (e.g., a single pole double throw (SPDT)).

The processor 480 can send a control signal indicating the CA band combination to the path configuration unit 610. Next, according to a designated rule, the path configuration unit 610 can identify the path combination corresponding to the CA band combination indicated by the control signal among the path combinations. The pre-processing unit 430 can select a path combination based on at least one of, a designated rule, whether the CA band combination covers a frequency band (e.g., the second band) of the pre-processing unit 430, whether the frequency band of the pre-processing unit 430 covers the PCC, whether a main antenna of another frequency band of the CA band combination is shared with the frequency band of the pre-processing unit 430, and whether a sub antenna of the other frequency band is shared with the frequency band of the pre-processing unit 430.

For example, when the processor 480 sends a control signal indicating the third band+second band CA to the path configuration unit 610, the path configuration unit 610 can confirm the second band included in the third band+second band CA, determine whether a sub antenna (e.g., the second antenna) of the third band is shared with the second band, and determine to operate in the cross mode.

The combiner 620 can include a plurality of paths. The paths each can include paths having different weighting ratios, in order to compensate for an antenna gain difference. The antenna gain can be a product of antenna directivity by antenna radiation efficiency. The combiner 620 can include various components, such as passive components, which can include a capacitor, a resistance, or an inductor. For example, when the antenna gain difference of the first antenna 411 and the second antenna 413 is 6 dB, two paths can have the combination gain of 1:4 (i.e., the weight factor 4). The two paths can include at least one resistor, at least two capacitors, or at least two inductors, having a value that will provide a gain of 1:4.

The combiner 620 can adaptively configure the combination gain of the paths. The components of the combiner 620 can be variable components. For example, the combiner 260 can include at least one of a variable capacitor, a variable resistor, and a variable inductor. The combiner 620 can adjust the combination gain of the paths according to the control signal received from the processor 480. The processor 480 can send a control signal for controlling the variable components based on a value determined by the performance difference of the first antenna 411 and the second antenna 413, to the combiner 620. The combiner 620 can set values of the variable components according to the control signal, and thus configure the paths having a particular combination gain.

Since the combiner 620 can tune the weight factor, the electronic device 401 may adaptively change the weight factor, instead of changing the path configuration. Specifically, instead of switching from the direct mode to the cross mode, the electronic device 401 can tune the weighting ratio of 1:2 to 2:1, that is, the weight factor 2 to ½. The processor 480 can send a control signal to the combiner 620 to tune the weighting ratio.

The combiner 620 can generate one output signal by combining a plurality of inputs. The combiner 620 can connect the configured paths to the output of the path configuration unit 610 so as to attain a particular combination gain. The combiner 620 can combine the output signals of the path configuration unit 610 as a single output signal using the configured paths. When operating in the cross mode and having the combination gain of 2:1, the combiner 620 can connect the signal 455 to the first path and the signal 453 to the second path, apply the combination gain 2 to the signal 455 and 1 to the signal 453, and thus generate the output signal 470. When receiving the signal 455 along among the second band 453 and the second band signal 455, the combiner 620 can generate the output signal 470 by applying the combination gain 2. In doing so, since the signal 453 is input at the intensity close to zero, the combination gain, which is applied, can rarely affect the output signal 470.

Figure 7:
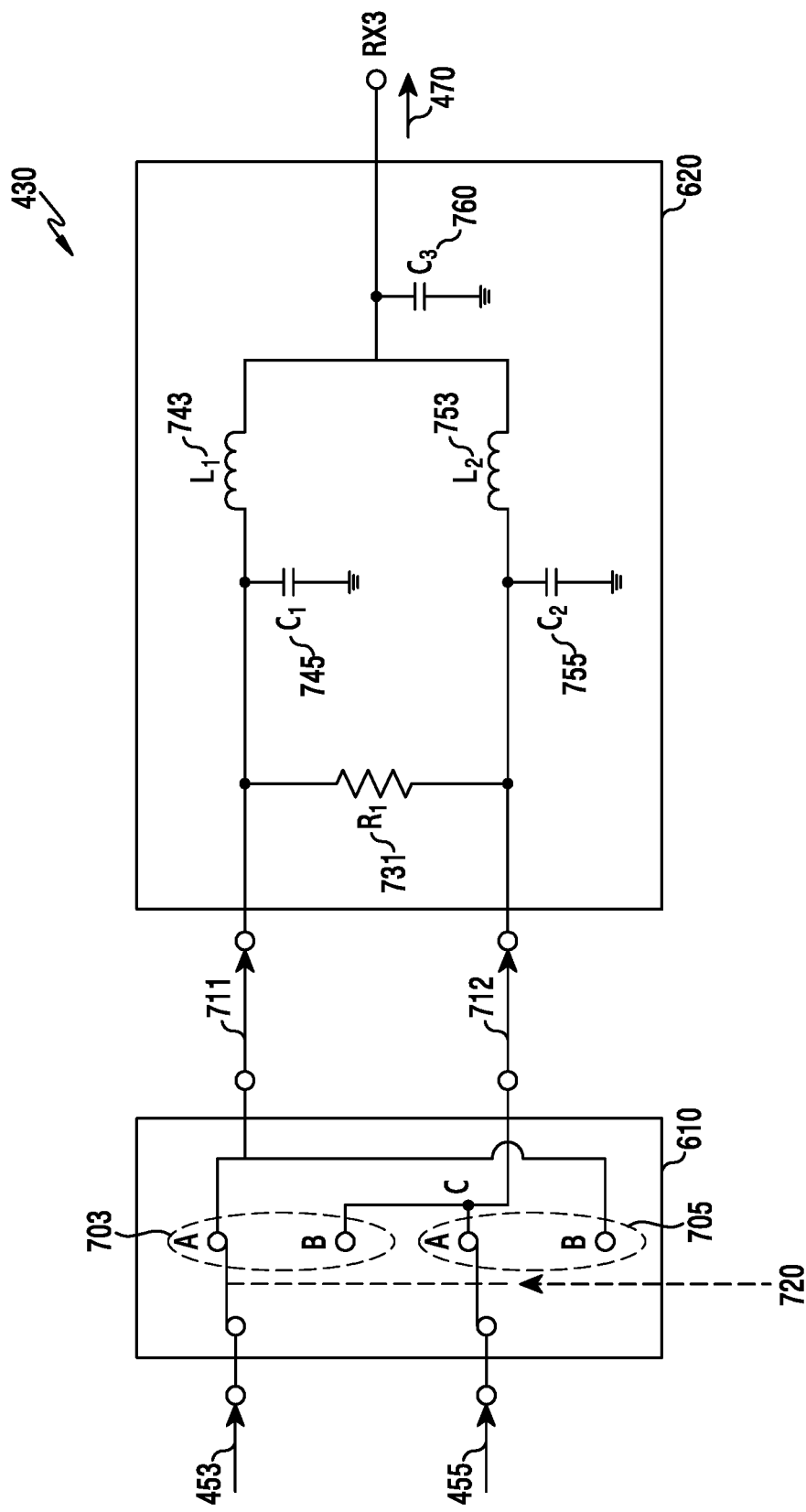
FIG. 7 is a diagram of a path configuration unit and a combiner, according to an embodiment of the present disclosure.

FIG. 7 is a diagram of a path configuration unit and a combiner, according to an embodiment of the present disclosure. The path configuration unit can be the path configuration unit 610 of FIG. 6, and the combiner can be the combiner 620 of FIG. 6.

The path configuration unit 610 can include a DPDT switch. When the path configuration unit 610 includes the DPDT switch, the path configuration unit 610 can be 1.1 mm×1.5 mm in size. The path configuration unit 610 can include two DPDT switches 703 and 705 including C contacts. The path configuration unit 610 can select one of a path combination A and a path combination B under control of the control signal 720 received from a processor 480. When an index of the control signal 720 is 1 indicating the direct mode, the path configuration unit 610 can select the path combination A. That is, the path configuration unit 610 can configure the paths to connect the RF signal 453 to the first path 711 and the RF signal 455 to the second path 712. Conversely, when the index of the control signal 720 is 2 indicating the cross mode, the path configuration unit 610 can select the path combination B. That is, the path configuration unit 610 can configure the paths to connect the RF signal 453 to the second path 712 and the RF signal 455 to the first path 711.

Although the path configuration unit 610 is the DPDT switch having the C contacts, the path configuration unit 610 may include a double pole single throw (DPST) switch including an inverter, or a DPDT switch having OFF input. For example, the path configuration unit 610 may not connect some of the RF signals to the particular path in order to input a signal 0 to the particular path according to the configured band combination.

The combiner 620 can be a passive combiner configured as a passive component. The combiner 620 can include at least one resistor, an inductor, or a capacitor, as the passive component. The combiner 620 can include a resistor 731, inductors 743 and 753, and capacitors 745, 755, 760. To obtain a designated combination gain, the combiner 620 can include the resistor 731 having a particular resistance value, the inductors 743 and 753 having particular inductance values, and the capacitors 745, 755, 760 having particular capacitance values. The designated combination gain can be determined by the performance difference of the first antenna 411 and the second antenna 413. The combiner 620, which is the passive component, can be implemented using a printed circuit board (PCB) and have a relatively small mounting area. For example, a size of the combiner 620 can be 2 mm×2 mm.

The resistor 731 can be the component required for signal flow isolation between the first path 711 and the second path 712, and the resistor 731 can minimize currents leaked from the first path 711 to the second path 712 through the matched resistor. When signals input through the first path 711 and the second path 712 pass through a low noise amplifier, isolation is guaranteed between the low noise amplifier outputs, and the resistor 731 can be removed if necessary. In this case, the connection to the resistor 731 can be open.

The capacitance value of the capacitor 760 can be equal to a sum of the capacitance of the capacitor 745 and the capacitance of the capacitor 755. The capacitor 760 combines signals at a node where a first impedance for the first path 711 and a second impedance for the second path 712 contact, and simplifies a circuit for the first impedance and the second impedance. The capacitance of the capacitor 760 can be set to the sum of the capacitance of the capacitor 745 and the capacitance of the capacitor 755. The first impedance and the second impedance each can be a set of components for signal distribution for a specific weight factor.

The inductance of the inductor 743 and the capacitance of the capacitor 745, and the inductance of the inductor 753 and the capacitance of the capacitor 755 are determined based on a weight factor according to a performance (e.g., the antenna gain) difference of the first antenna (e.g., the first antenna 411) and the second antenna (e.g., the second antenna 413).

Figure 8:
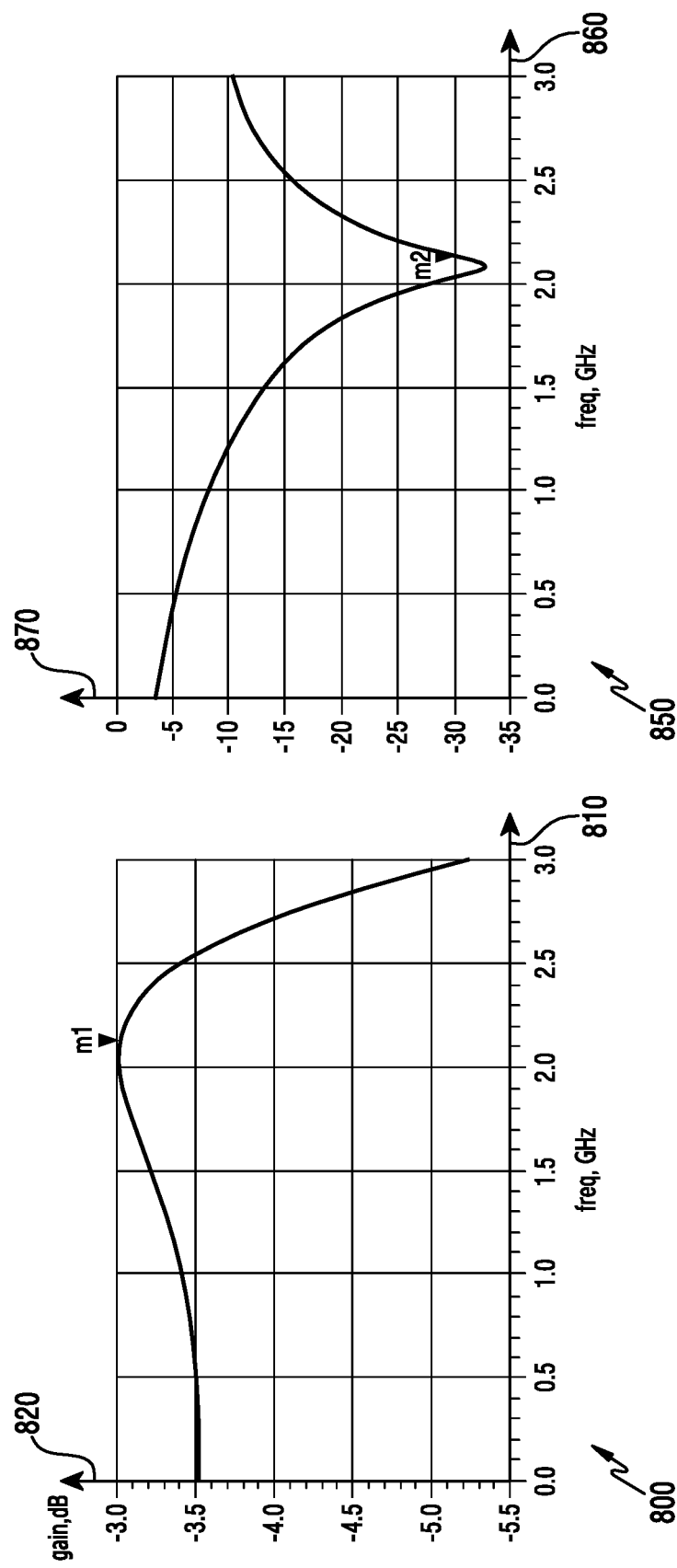
FIG. 8 is a diagram of simulation results for determining a configuration of a combiner, according to an embodiment of the present disclosure.

FIG. 8 is a diagram of simulation results for determining a configuration of a combiner, according to an embodiment of the present disclosure. The combiner can be the combiner 620 of FIG. 7. The passive components of FIG. 7 are used in conjunction with FIG. 8 for ease of understanding.

To determine an LC time constant value and implementation characteristics of the combiner 620, a simulation can be conducted. The simulation can acquire an insertion loss value and a combination loss value for a particular passive component. The electronic device 401 can perform RF calibration using the acquired insertion loss and combination loss values.

For example, referring back to FIG. 7, the simulation can be conducted when, in the combiner 620, the resistor 731 is set to 100Ω, the inductors 743 and 753 are set to 5.6 nH, the capacitors 745 and 755 are set to 1 pF, the capacitor 760 is set to 2 pF, the impedance values for the input to the first path 711, the input to the second path 712, and the output signal 480 are set to 50, and an operating frequency band is set to the B4 DL band 2.135 GHz. The simulation results are shown in a graph 800 and a graph 850 of FIG. 8.

The graph 800 shows relations between a frequency and an insertion loss due to the combiner 620. In the graph 800, a horizontal axis 810 indicates a frequency value of the frequency band, and a vertical axis 820 indicates a size difference of the input and the output of the combiner 620. Based on the graph 800, a capacitor of the same capacitance and an inductor of the same inductance are configured in two paths, and the insertion loss of the first path 711 and the insertion loss (m1) of the second path 712 are equally 3.026 dB.

The graph 850 shows relations between the frequency and a coupling loss of the first path 711 and the second path 712. In the graph 850, a horizontal axis 860 indicates the frequency value of the frequency band, and a vertical axis 870 indicates a signal level leaked from the first path 711 to the second path 712. Based on the graph 850, the coupling loss (m2) which is the leaked signal can be 30.359 dB.

In the simulations of FIG. 8, the electronic device 401 can determine a calibration offset value based on the insertion loss 3.026 dB and the coupling loss 30.359 dB. The electronic device 401 can perform RF calibration using the determined calibration offset value.

Figure 9:
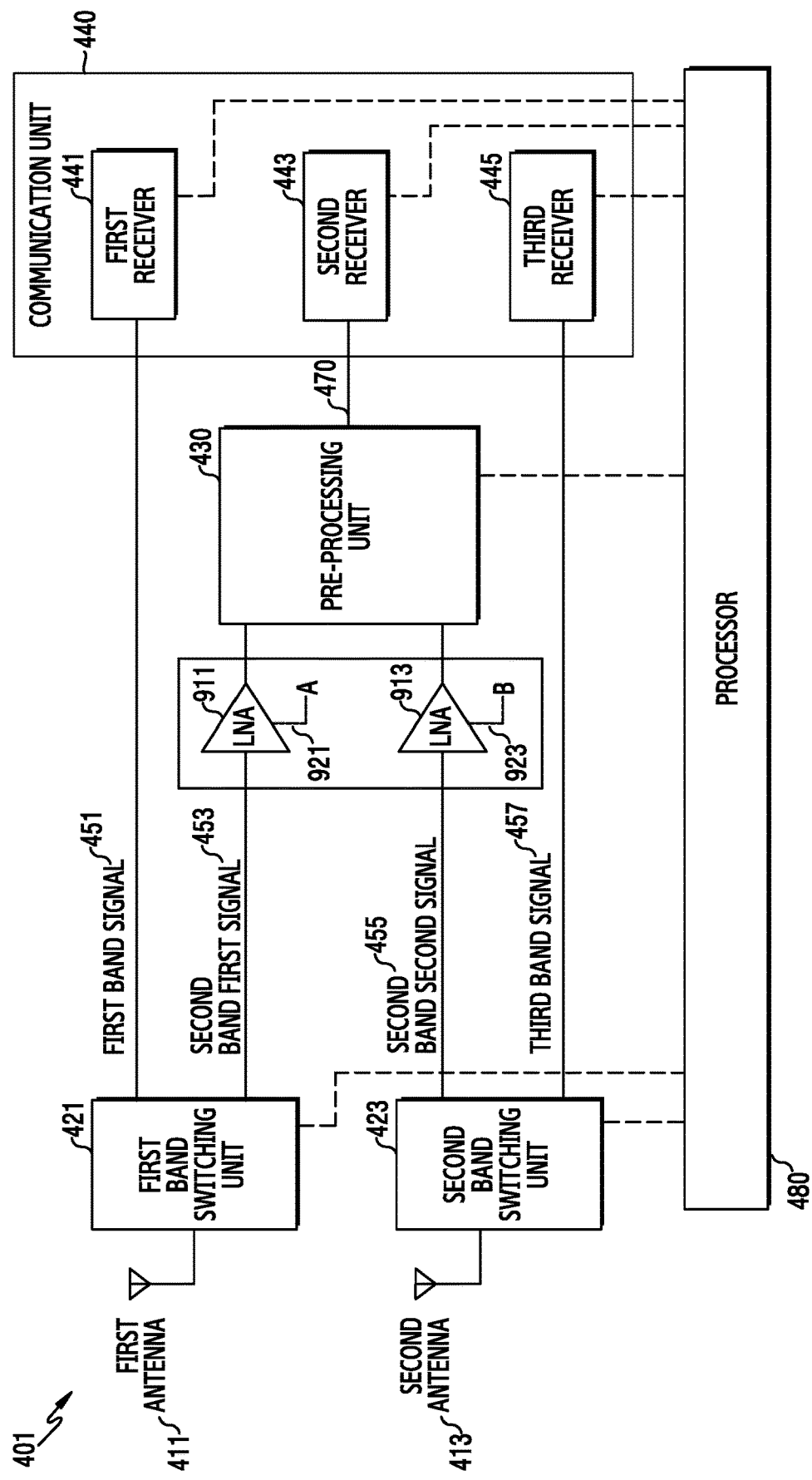
FIG. 9 is a diagram of coupling of an electronic device and a low noise amplifier (LNA), according to an embodiment of the present disclosure.

FIG. 9 is a diagram of an electronic device including an LNA, according to an embodiment of the present disclosure. The electronic device can be the electronic device 401 of FIG. 4.

The electronic device 401 can include the LNA between a band switching unit and a pre-processing unit. For example, the electronic device 401 can include an LNA 911 between the first band switching unit 421 and the pre-processing unit 430, and the electronic device 401 can include an LNA 913 between the second band switching unit 423 and the pre-processing unit 430. The electronic device 401 can include the LNA in each path in order to compensate for the insertion loss of the pre-processing unit 430 and the path loss in the RF signal flow. While the LNAs added to the two antenna paths consume currents of about 10 mA (2×5 mA), a conventional receiver is also subject to the same loss for the path compensation, and there is no current increase, when compared with conventional receivers. The LNA can be implemented using a separate chip (or an SOC). That is, the LNA can be an external LNA (eLNA).

To reduce the current consumption of the LNA, the electronic device 401 can control the LNA 911 and the LNA 913 of the reception path to operate in a bypass mode or in a gain mode according to an electric field (received signal code power (RSCP) or received signal received power (RSRP) and channel quality information, frame error rate (FER), bit error rate (BER), signal to noise ratio (SNR), or signal-to-interference pulse noise ratio (SINR)).

The electronic device 401 can adaptively adjust influence on the combination gain when the pre-processing unit 430 combines signals, according to output impedance of the LNA 911 and the LNA 913. The electronic device 401 can adaptively adjust the combination gain by sending a control signal 921 to the LNA 911 and a control signal 923 to the LNA 913 through the processor 480.

The electronic device 401 can perform RF calibration for accurate control by considering the gain and the path loss of the LNA. The electronic device 401 can conduct the RF calibration to compensate for a level difference between a reference signal from the antenna and a receiver output signal.

More specifically, the electronic device 401 can determine a different compensation value according to the received reference signal path, and conduct the RF calibration with the determined compensation value. The compensation value can be referred to as a calibration offset. When using both of the first antenna 411 and the second antenna 413 (e.g., the second inter-band CA, the second band+first band CA), the electronic device 401 can set a first calibration offset value. The first calibration offset value can be preset according to a result obtained from the reference signal transmitted via the first antenna 411 and the second antenna 413.

When using only the second antenna 413 among the first antenna 411 and the second antenna 413 (e.g., the first band+second band CA), the electronic device 401 can set a second calibration offset value. The second calibration offset value can be preset according to the reference signal transmitted via the second antenna 413.

When using only the first antenna 411 among the first antenna 411 and the second antenna 413 (e.g., the second band+third band CA, the third band+second band CA), the electronic device 401 can set a third calibration offset value. The third calibration offset value can be preset according to a result obtained from the reference signal transmitted via the first antenna 411. In doing so, with the first antenna 411, the calibration offset value can vary according to the path configured by the pre-processing unit 430. The electronic device 401 can set the third calibration offset value when the reference signal is received in the direct mode via the first antenna 411, and set the fourth calibration offset value when the reference signal is received in the cross mode. The electronic device 401 can define various calibration offset values according to the gain difference based on various paths.

The calibration compensation values based on the paths can be set as shown in Table 3.

TABLE 3

| Band | Second band | 1 + 2 CA | 2 + 1 CA | 2 + 3 CA | 3 + 2 CA | 2 + 3 CA |
|---|---|---|---|---|---|---|
| Example | B4 | B2 + B4 | B4 + B2 | B4 + B30 | B4 + B2 | B4 + B30 |
| First Antenna | ○ | B2 | B4 | B4 | B4 | B4 |
| Second Antenna | ○ | B4 | B4 | B30 | B30 | B30 |
| Operation mode | Direct | Direct | Direct | Cross | Cross | Direct |
| Calibration index | #1 | #2 | #1 | #3 | #3 | #4 |

The electronic device 401 can perform the RF calibration with the determined offset value. The electronic device 401 can store all of the determined offset values based on the CA band combinations. The processor 480 can send a control signal notifying the path configuration corresponding to a particular band combination (e.g., the second band+first band CA) to the pre-processing unit 430. In response to the control signal, the pre-processing unit 430 can carry out the RF calibration with the determined calibration offset value (e.g., the first calibration offset value).

While two LNAs are illustrated in FIG. 9, the present disclosure is not limited to two LNAs. That is, when three or more paths are connected to the pre-processing unit 430, the LNA can be added for each of the three or more paths. Notably, the LNA can be added to a path not including the pre-processing unit 430 if necessary.

Figure 10:
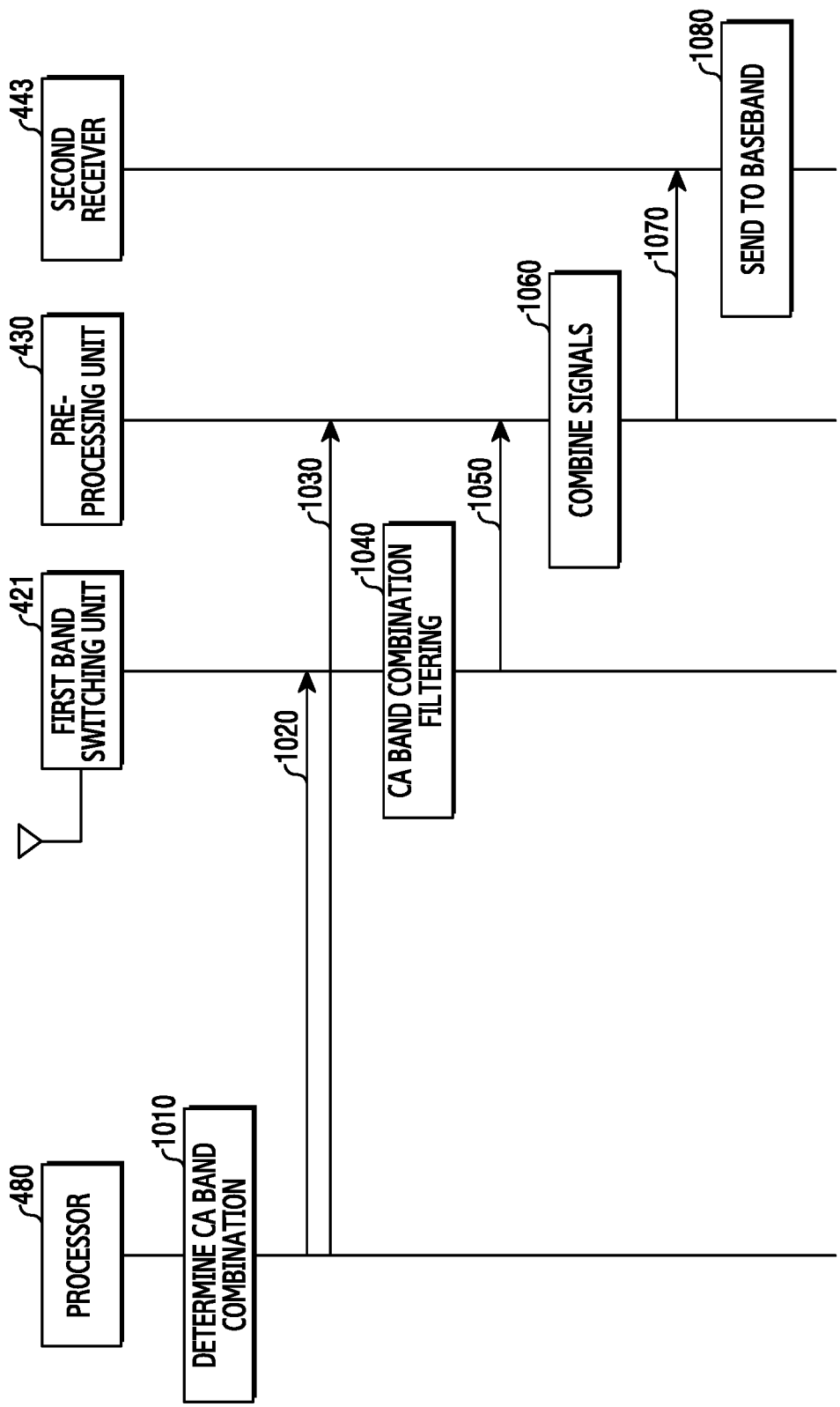
FIG. 10 is a flowchart of an electronic device, according to an embodiment of the present disclosure.

FIG. 10 is a diagram of an electronic device, according to an embodiment of the present disclosure. The electronic device can be the electronic device 401 of FIG. 4. The electronic device 401 can include a processor 480, a band switching unit, a pre-processing unit 430, and an RF receiver. The band switching unit is described based on a first band switching unit 421, which can be applied to other band switching units in the same or similar manner. The RF receiver is described based on a second receiver 443, which can be applied to other RF receives connected to the pre-processing unit 430 in the same or similar manner. The band switching unit, the pre-processing unit 430, and the RF receiver are components corresponding to an RF front end.

In step 1010, the processor 480 can determine a CA band combination. The processor 480 can determine a particular one of CA band combinations in a designated order or under control of a network provider. For example, the processor 480 can determine a second band+third band CA as the CA band combination.

Upon determining the CA band combination for signal reception, the processor 480 can generate a first control signal for controlling the band switching unit. The processor 480 can generate the first control signal to indicate which band pass filter is to be connected with a particular antenna according to the CA band combination. When determining the CA band combination for the signal reception, the processor 480 can generate a second control signal for controlling path configuration of the pre-processing unit 430. The processor 480 can determine a signal configuration of signals input from the pre-processing unit according to the CA band combination, and generate the second control signal for connecting each input signal to a corresponding path based on the determined path configuration. When the weight factor is variable, the processor 480 may further generate a third control signal for controlling the weight factor in the pre-processing unit 430.

In step 1020, the processor 480 can send the first control signal to the first band switching unit 421.

In step 1030, the processor 480 can send the second control signal to the pre-processing unit 430. The processor 480 may further send the third control signal in addition to the second control signal.

The processor 480 can send the first control signal to the first band switching unit 421 and the second signal to the pre-processing unit 430 in sequence or at the same time.

In step 1040, the first band switching unit 421 receiving the first control signal can filter signals with a band corresponding to the first antenna 411 of the CA band combination. For example, when the first control signal indicates B2+B4 CA, the first band switching unit 421 can filter signals fed from the antenna 411 with the B2 band. The first band switching unit 421 can select a filter corresponding to the B2 band, and separate a signal corresponding to the B2 band from the signals received from the first antenna; the signal can be an RF signal.

In step 1050, the first band switching unit 421 can send the separated signal to the pre-processing unit 430. To compensate for an insertion loss and a path loss for the addition of the pre-processing unit 430, an LNA can be added between the first band switching unit 421 and the pre-processing unit 430.

In step 1060, the pre-processing unit 430 can combine the received signals. The pre-processing unit 430 can be the pre-processing unit 430 for the B4 band. The pre-processing unit 430 can combine B4 band signals. Although not depicted in FIG. 10, the pre-processing unit 430 can also receive signals from the second band switching unit 423 including a B4 band filter besides the first band switching unit 421. As mentioned earlier, when the electronic device 401 includes the LNA, at least one of the received signals can be an amplified signal.

The pre-processing unit 430 can configure paths for the received signals. The pre-processing unit 430 can determine a weighting ratio for the paths, which may be referred to as a weight factor. The weighting ratio can be determined based on a performance difference of antennas connected with the pre-processing unit. For example, when an antenna gain difference of the first antenna 411 and the second antenna 413 is 3 dB, the weight factor can be determined to 4. In this case, a weight 1 can be applied to a transmission path signal of the first antenna 411, and a weight 2 can be applied to a transmission path signal of the second antenna 413. The pre-processing unit 430 can combine the signals based on the configured path and the determined weighting ratio. The combined signal is an RF signal. The combined signal can be referred to as a pre-processed signal.

In step 1070, the pre-processing unit 430 can provide the combined signal (the pre-processed signal) to the second receiver 443. The second receiver 443 can be an RF receiver. Alternatively, the second receiver 443 can be included in an RF transceiver. Due to sending, by the preprocessing unit 430, the signal to the second receiver 443 after combining the signals of the first antenna 411 and the second antenna 413, the number of receivers can be reduced, compared with one receiver per one antenna. In addition, by decreasing the number of the receivers, the electronic device 401 may reduce overall current consumption.

In step 1080, the second receiver 443 can forward the received RF signal to a baseband processing unit. Specifically, the second receiver 443 can down-convert the RF signal 470 received from the pre-processing unit 430. The second receiver 443 can lower the RF frequency to the baseband frequency using a mixer and a local oscillator (LO), or select and amplify a channel through an image frequency (IF) and then down-convert to the baseband signal if necessary.

As shown in FIG. 10, the electronic device 401 does not combine the signals at the baseband end, and thus does not need an additional RF receiver, and can exhibit the same performance without a configuration and components of a particular CP. Also, the electronic device 401 can enhance the reception performance in the band (e.g., B4) of the pre-processing unit 430 by adaptively applying the weight factor based on the antenna performance according to the CA band combination in the pre-processing unit 430.

The electronic device 401 supporting LTE CA using multiple antennas can exhibit the reception performance in the B4 as shown in Table 4.

TABLE 4

|  | Low | Mid | High | Avg |
| --- | --- | --- | --- | --- |
| LTE B4 sensitivity [dBm] | | | | |
| Performance of first antenna | −97.8 | −96.8 | −96.6 | −96.9 |
| Performance of second antenna | −100.6 | −100.6 | −100.4 | −100.5 |
| Performance of Combination | −102.2 | −102.2 | −101.1 | −101.8 |
| Improved performance | +1.6 | +1.6 | +0.7 | +1.3 |
| LTE B4 TIS [dBm] | | | | |
| Performance of first antenna | −91.3 | −88.7 | −89.0 | −89.7 |
| Performance of second antenna | −91.1 | −93.2 | −93.4 | −92.6 |
| Performance of Combination | −93.2 | −93.7 | −94.6 | −93.8 |
| Improved performance | +2.1 | +0.5 | +1.5 | +1.2 |

The performance of the second antenna 413 is better than the performance of the first antenna 411, and the results of Table 4 are yielded with the weight factor determined to 1:2 in the combiner. Conduction reception performance improves by +0.7 dB~+1.6 dB per channel to the performance of the second antenna 413, and achieves about 1.3 dB on average. Radiation reception performance improves by +0.5 dB~+2.1 dB per channel to the performance of the second antenna 413 and achieves about 1.2 dB on average.

The electronic device 401 according to various embodiments of the present disclosure does not require components such as the CP for combining signals at the baseband end and the additional RF receiver, and can be implemented using conventional CP and components having a single RF receiver structure. Therefore, its hardware implementation for improving the same reception performance can lower costs.

According to an embodiment of the present disclosure, a method of an electronic device can include generating, by a pre-processing unit, based on identifying that a frequency band of a first signal received via a first antenna and a frequency band of a second signal received via a second antenna are a second band, a pre-processed signal by combining the first signal and the second signal based on a ratio of a weight factor, and providing, by the pre-processing unit, the pre-processed signal to a first RF receiver. The first antenna can be an antenna for a first band and the second band, and the second antenna can be an antenna for the second band and a third band.

The method can include transmitting, to a second RF receiver, a third signal of the first band received via the first antenna, and performing a CA by using the pre-processed signal transmitted to the first RF receiver and the third signal transmitted to the second RF receiver.

The method can include transmitting, to a third RF receiver, a fourth signal of the third band received via the second antenna and performing a CA by using the third signal transmitted to the second RF receiver, the fourth signal transmitted to the third RF receiver, and the pre-processed signal transmitted to the first RF receiver.

Generating the pre-processed signal can include selecting one of a first path and a second path which are included in the pre-processing unit as a reception path for the first signal, selecting another of the first path and the second path as a reception path for the second signal, and generating the pre-processed signal by combining the first signal and the second signal which pass through the selected paths.

Generating the pre-processed signal can include selecting, based on identifying that the frequency band of the first signal and the frequency band of the second signal are not the second band, the first path as the reception path for the second signal, and selecting, based on identifying that the frequency band of the second signal is the second band, the first path as the reception path for the first signal and the second path as the reception path for the second signal.

The weight factor can be defined as a weight ratio of the second path to the first path, and can be determined by including a difference between an antenna gain of the first antenna and an antenna gain of the second antenna.

The pre-processing unit can include at least one resistor having a value determined according to the weight factor, at least one capacitor, and at least one inductor.

The at least one capacitor can include at least one variable capacitor adaptively adjusted based on the weight factor, and the at least one inductor can include at least one variable inductor adaptively adjusted based on the weight factor.

The method can further include compensating the pre-processed signal based on a designated calibration offset value. The designated calibration offset value can correspond to a specific path configuration among a plurality of calibration offset values, and the specific path configuration can correspond to the frequency band of the first signal and the frequency band of the second signal among a plurality of path configurations which are determined based on the first path and the second path included in the pre-processing unit and a combination between one of the first band, the second band, and the third band and the second band.

As set forth above, the apparatus and the method described herein can combine the signals received from the antennas at the RF front end, and thus reduce the hardware implementation cost.

The apparatus and the method described herein can configure a different path per antenna according to an antenna performance difference, and thus effectively receive the signal using the CA.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
   a first antenna for a first band and a second band;
   a second antenna for the second band and a third band;
   a first switching unit connected to the first antenna, the first switching unit including a first filter configured to receive the first band and a second filter configured to receive the second band;
   a second switching unit connected to the second antenna, the second switching unit including a third filter configured to receive the second band and a fourth filter configured to receive the third band; and
   a pre-processing unit configured to:
   generate a pre-processed signal by combining a first radio frequency (RF) signal in the second band received via the first antenna and low noise amplified by a first amplifier and a second RF signal in the second band received via the second antenna and low noise amplified by a second amplifier based on a weight factor defined by a ratio of a second path weight to a first path weight; and
   transmit, to a first RF receiver, the pre-processed signal; and
   a processor configured to:
   control the first switching unit to transmit a third RF signal in the first band received via the first antenna to a second RF receiver; and
   control the second switching unit to transmit a fourth RF signal in the third band received via the second antenna to a third RF receiver.

2. The electronic device of claim 1, wherein the processor is further configured to
   perform carrier aggregation (CA) using the pre-processed signal transmitted to the first RF receiver and the third RF signal transmitted to the second RF receiver.

3. The electronic device of claim 2, wherein the processor is further configured to
   perform the CA using the third RF signal transmitted to the second RF receiver, the fourth RF signal transmitted to the third RF receiver, and the pre-processed signal transmitted to the first RF receiver.

4. The electronic device of claim 1, wherein the pre-processing unit is further configured to:
   select one of a first path and a second path which are included in the pre-processing unit as a reception path for the first RF signal;
   select another of the first path and the second path as a reception path for the second RF signal; and
   generate the pre-processed signal by combining the first RF signal and the second RF signal which pass through the selected paths.

5. The electronic device of claim 4, wherein the pre-processing unit is further configured to:
   select, based on identifying that a frequency band of the first RF signal and the frequency band of the second RF signal are not the second band, the first path as the reception path for the second RF signal; and
   select, based on identifying that the frequency band of the second RF signal is the second band, the first path as the reception path for the first RF signal and the second path as the reception path for the second RF signal.

6. The electronic device of claim 4, wherein the weight factor is defined as a weight ratio of the second path to the first path, and is determined by including a difference between an antenna gain of the first antenna and an antenna gain of the second antenna.

7. The electronic device of claim 4, wherein the pre-processing unit comprises at least one resistor having a value determined according to the weight factor, at least one capacitor, and at least one inductor.

8. The electronic device of claim 7, wherein the at least one capacitor comprises at least one variable capacitor adaptively adjusted based on the weight factor, and
   wherein the at least one inductor comprises at least one variable inductor adaptively adjusted based on the weight factor.

9. The electronic device of claim 1, further comprising:
   a compensation unit configured to compensate the pre-processed signal based on a designated calibration offset value,
   wherein the designated calibration offset value corresponds to a specific path configuration among a plurality of calibration offset values, and
   wherein the specific path configuration corresponds to a frequency band of the first RF signal and the frequency band of the second RF signal among a plurality of path configurations which are determined based on the first path and the second path included in the pre-processing unit and a combination between one of the first band, the second band, and the third band and the second band.

10. A method of an electronic device, comprising:
    providing, by a first switching unit, to a pre-processing unit, a first radio frequency (RF) signal in a second band received from a first antenna;
    providing, by a second switching unit, to the pre-processing unit, a second RF signal in the second band received from a second antenna;
    generating, by a pre-processing unit, a pre-processed signal by combining the first RF signal low-noise amplified by a first amplifier and the second RF signal low-noise amplified by a second amplifier based on a weight factor defined by a ratio of a second path weight to a first path weight;
    providing, by the pre-processing unit, to a first RF receiver, the pre-processed signal;
    providing, by the first switching unit, to a second RF receiver, a third RF signal in a first band received from the first antenna; and
    providing, by the second switching unit, to a third RF receiver, a fourth RF signal in a third band received from the second antenna,
    wherein the first antenna is an antenna for the first band and the second band,
    wherein the second antenna is an antenna for the second band and the third band,
    wherein the first switching unit of the electronic device includes a first filter configured to receive the first band and a second filter configured to receive the second band, and
    wherein the second switching unit of the electronic device includes a third filter configured to receive the second band and a fourth filter configured to receive the third band.

11. The method of claim 10, further comprising:
    performing carrier aggregation (CA) using the pre-processed signal transmitted to the first RF receiver and the third RF signal transmitted to the second RF receiver.

12. The method of claim 11, further comprising:
performing CA using the third RF signal transmitted to the second RF receiver, the fourth RF signal transmitted to the third RF receiver, and the pre-processed signal transmitted to the first RF receiver.

13. The method of claim 10, wherein generating the pre-processed signal comprises:
selecting one of a first path and a second path which are included in the pre-processing unit as a reception path for the first RF signal;
selecting another of the first path and the second path as a reception path for the second RF signal; and
generating the pre-processed signal by combining the first RF signal and the second RF signal which pass through the selected paths.

14. The method of claim 13, wherein generating the pre-processed signal comprises:
selecting, based on identifying that a frequency band of the first RF signal and the frequency band of the second RF signal are not the second band, the first path as the reception path for the second RF signal; and
selecting, based on identifying that the frequency band of the second RF signal is the second band, the first path as the reception path for the first RF signal and the second path as the reception path for the second signal.

15. The method of claim 13, wherein the weight factor is defined as a weight ratio of the second path to the first path, and is determined by including a difference between an antenna gain of the first antenna and an antenna gain of the second antenna.

16. The method of claim 10, wherein the pre-processing unit comprises at least one resistor having a value determined according to the weight factor, at least one capacitor, and at least one inductor.

17. The method of claim 16, wherein the at least one capacitor comprises at least one variable capacitor adaptively adjusted based on the weight factor, and
wherein the at least one inductor comprises at least one variable inductor adaptively adjusted based on the weight factor.

18. The method of claim 10, further comprising:
compensating the pre-processed signal based on a designated calibration offset value,
wherein the designated calibration offset value corresponds to a specific path configuration among a plurality of calibration offset values, and
wherein the specific path configuration corresponds to a frequency band of the first RF signal and the frequency band of the second RF signal among a plurality of path configurations which are determined based on the first path and the second path included in the pre-processing unit and a combination between one of the first band, the second band, and the third band and the second band.

19. An electronic device comprising:
a first antenna for a first band and a second band;
a second antenna for the second band and a third band;
a first switching unit connected to the first antenna, the first switching unit including a first filter configured to receive the first band and a second filter configured to receive the second band;
a second switching unit connected to the second antenna, the second switching unit including a third filter configured to receive the second band and a fourth filter configured to receive the third band; and
an analog combiner configured to:
receive a first signal of the second band via the first antenna and receive a second signal of the second band via the second antenna;
generate, based on receiving the first signal and the second signal, a third signal for obtaining a diversity gain by combining the first signal and the second signal based on a ratio which is determined by an impedance value of impedance elements included in the analog combiner and which is defined by a ratio of a second path weight to a first path weight; and
provide, to a first receiver, the third signal; and
a processor configured to control the first switching unit to transmit a fourth signal of the first band received from the first antenna to a second receiver,
wherein information included in the first signal corresponds to information included in the second signal.

* * * * *